(12) United States Patent
Grams et al.

(10) Patent No.: US 6,579,053 B1
(45) Date of Patent: Jun. 17, 2003

(54) ROBOTIC CONTAINERIZATION AND PALLETIZING SYSTEM

(75) Inventors: Robert S. Grams, Waukesha, WI (US); Thomas Watson, Novi, MI (US); Patrick Resch, Mayville, WI (US); Gilbert Dominguez, Mukwonago, WI (US)

(73) Assignee: ABB Flexible Automation, Inc., New Berlin, WI (US)

( * ) Notice: Subject to any disclaimer, the term of this patent is extended or adjusted under 35 U.S.C. 154(b) by 0 days.

(21) Appl. No.: 09/521,989

(22) Filed: Mar. 9, 2000

Related U.S. Application Data

(60) Provisional application No. 60/124,427, filed on Mar. 15, 1999.

(51) Int. Cl.$^7$ ................................................ B65G 1/04
(52) U.S. Cl. .................... 414/269; 294/67.32; 294/106; 198/435; 198/348; 414/626; 414/753.1; 414/927; 414/399; 414/273; 414/268; 414/799; 414/792.9; 53/540; 901/31; 901/39
(58) Field of Search ................. 414/792.9, 266, 414/267, 268, 626, 269, 271, 399, 799, 273, 281, 282, 904, 927, 753.1; 53/540, 541; 294/67, 32, 99.1, 106; 901/31, 39; 198/435, 348

(56) References Cited

U.S. PATENT DOCUMENTS

| | | | |
|---|---|---|---|
| 1,244,856 A | | 10/1917 | Jennings |
| 1,438,162 A | | 12/1922 | Hoffman |
| 2,857,194 A | * | 10/1958 | Brown ................ 294/67.32 X |
| 2,946,618 A | * | 7/1960 | Klahn et al. ......... 294/63.32 X |

(List continued on next page.)

FOREIGN PATENT DOCUMENTS

| | | | | |
|---|---|---|---|---|
| EP | 0253790 | * | 1/1988 | ................ 414/399 |

OTHER PUBLICATIONS

C & D Robotics, Palletizing system: a bright idea, Modern Materials Handeling, Sep. 1991, 2 pages, Cahners Publishing Company.

(List continued on next page.)

*Primary Examiner*—Frank E. Werner
(74) *Attorney, Agent, or Firm*—Michael Best & Friedrich LLP

(57) ABSTRACT

A robotic containerization and palletizing system having a multiple-fingered end effector. The system includes a frame that defines one or more cells. Each cell has one gantry-type robot, which is mounted in a set of tracks on top of the frame. The robot is movable along two axes and has an arm to which the end effector is mounted. The end effector is designed to grasp trays, tubs, and similar items from a conveyor system running through the cell and load them in a cart or on a pallet. The items are gripped by two sets of fingers. One set of fingers may be mounted to a first plate and another set of fingers may be mounted to a carriage that moves in a horizontal direction, either toward or away from the first set of fingers. Each finger has a main shaft and a bent tip. The shafts are rotatable such that the tips can be moved underneath or out from under a load, depending upon whether a pick-up or drop-off operation is being performed. The end effector is designed to carry out top loading of carts and pallets and includes a measurement and containment plate that is used to detect and measure the height of trays and tubs placed in carts and on pallets. The measurement and containment plate also helps prevent loose mail in unsleeved trays or tubs from falling out of the trays or tubs during robotic transportation. The downward force exerted on the top of the mail tray/tub also helps maintain the grip of the fingers. In order to load carts having shelves, the gripper may also include a shelf-lowering assembly.

13 Claims, 41 Drawing Sheets

U.S. PATENT DOCUMENTS

| | | | |
|---|---|---|---|
| 3,424,488 A | | 1/1969 | Renfroe |
| 3,558,178 A | | 1/1971 | Taylor |
| 3,559,371 A | | 2/1971 | Borrowman |
| 3,976,321 A | * | 8/1976 | Dean .................. 294/67.32 X |
| 4,051,957 A | | 10/1977 | Parups |
| 4,911,608 A | | 3/1990 | Krappitz et al. |
| 4,936,735 A | | 6/1990 | Ryan |
| 4,975,018 A | | 12/1990 | Langenbacher et al. |
| 5,181,820 A | * | 1/1993 | Sjogren et al. ......... 414/399 X |
| 5,203,666 A | | 4/1993 | Mojden et al. |
| 5,293,983 A | | 3/1994 | Grapes et al. |
| 5,399,531 A | | 3/1995 | Wu |
| 5,415,518 A | | 5/1995 | Montgomery |
| 5,882,174 A | | 3/1999 | Woerner et al. |
| 5,944,479 A | | 8/1999 | Kanaya et al. |
| 6,082,080 A | * | 7/2000 | Holter et al. ......... 294/67.32 X |

OTHER PUBLICATIONS

C & D Robotics, Robots Lend Muscle To Palletizing, Managing automation 2, Jun. 1992, 2 pages, Thomas Publication.

C & D Robotics, Robotic Palletizers Tie 10 Lines Together, Jan. 1993, 4 pages, Cahners Publishing Company.

Alvey, Gantry Palletizer can span several conveyors, pallets, or workcells, Industrial Equipment News, Mar. 1993, 1 page, Thomas Publishing Company.

Advanced Technology and Research Corporation (ATR), Real Time Control Engineering Automation, 1997, 8 pages.

* cited by examiner

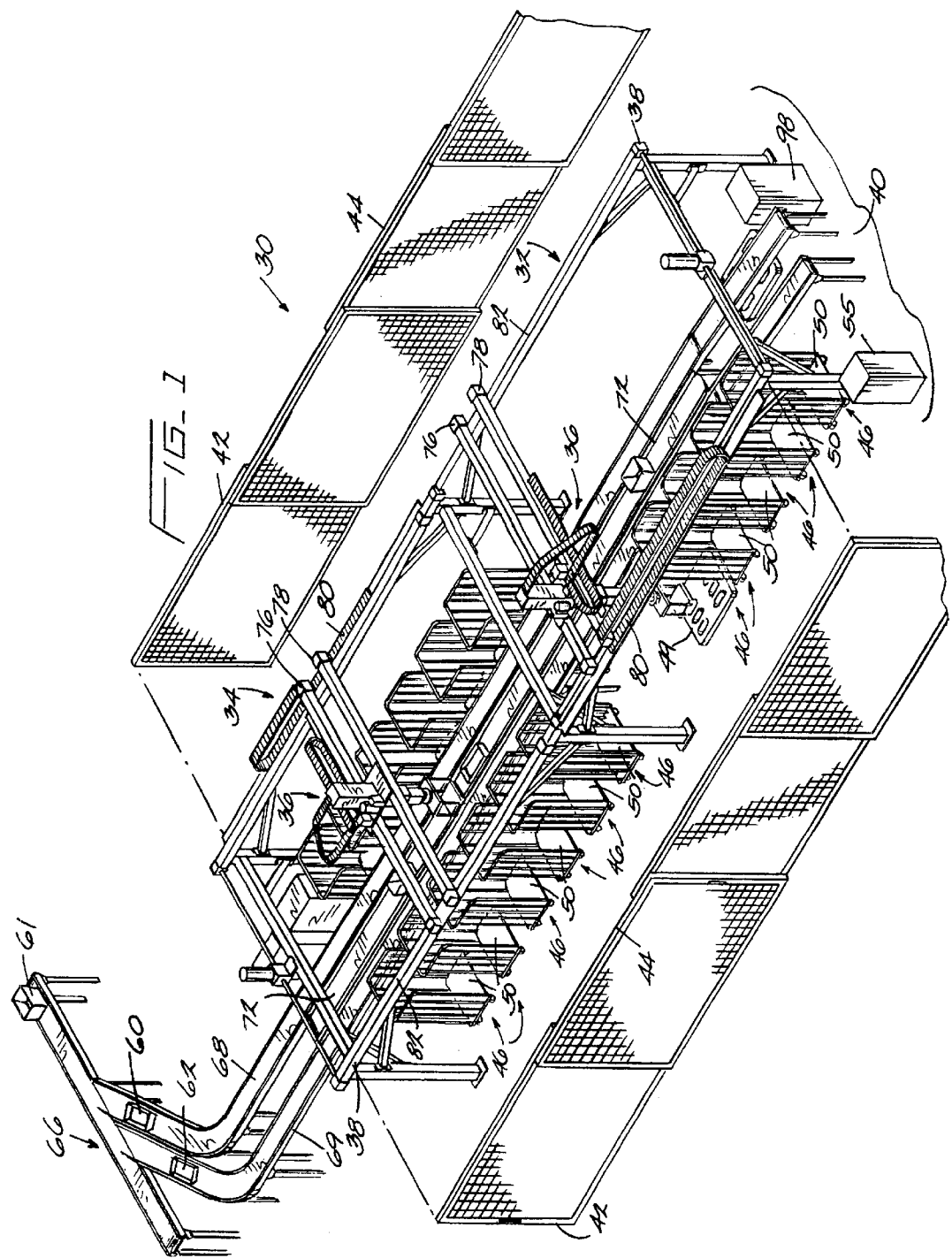

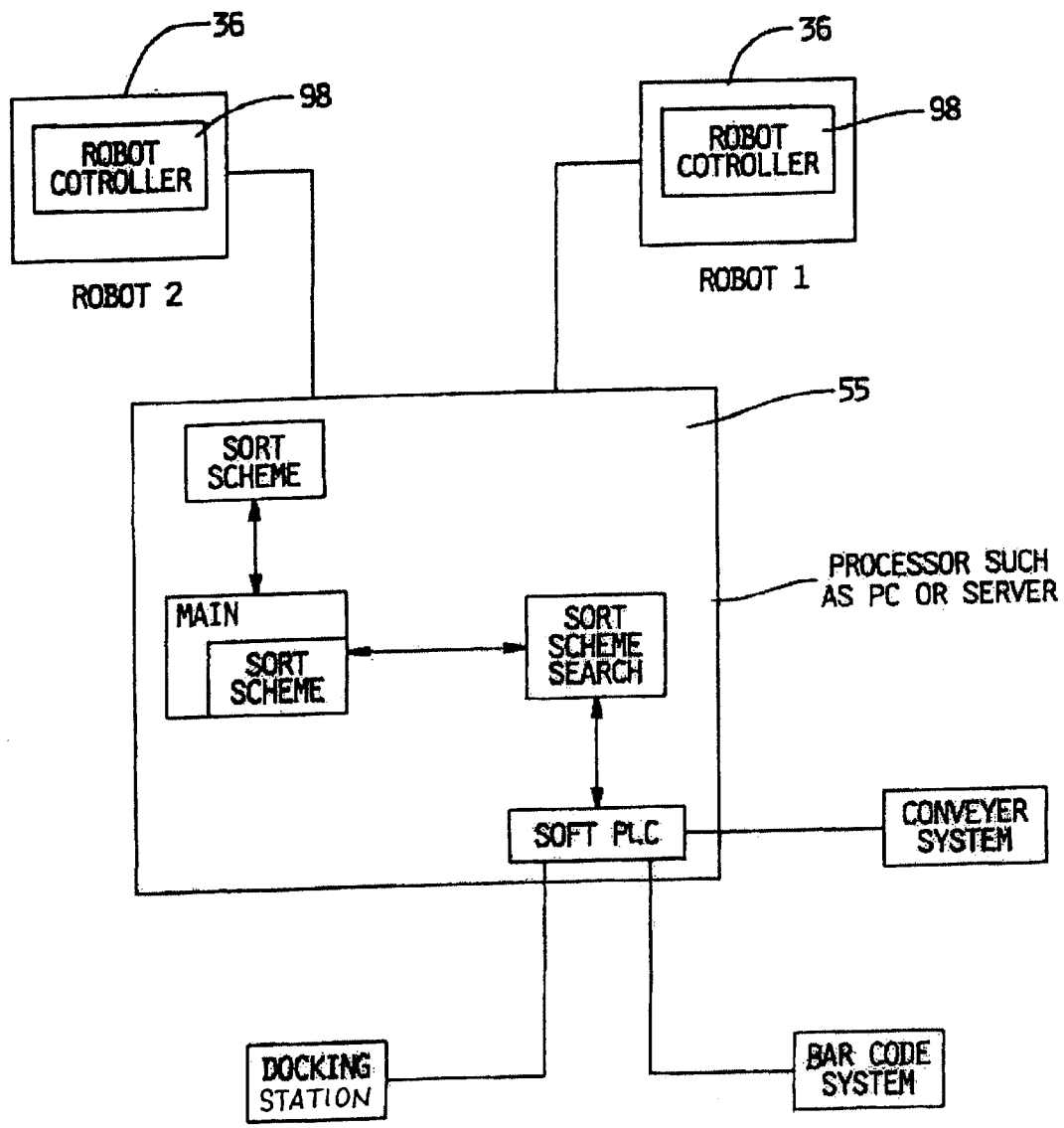
FIG_2A

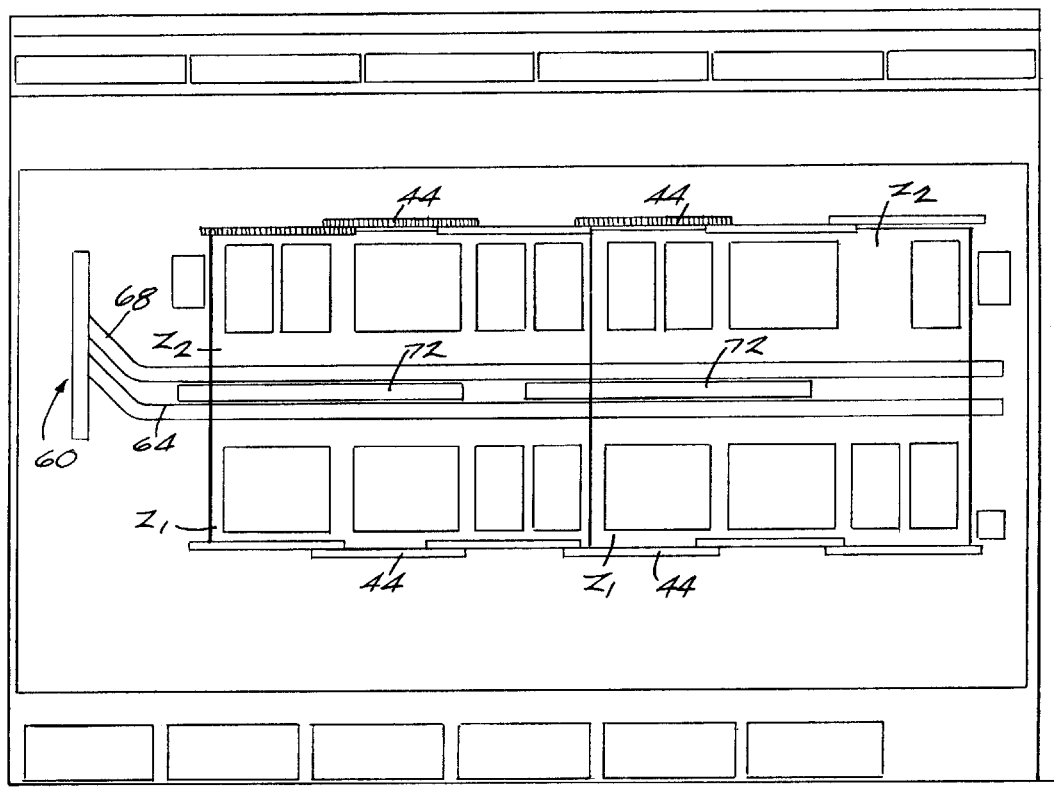
FIG_2B

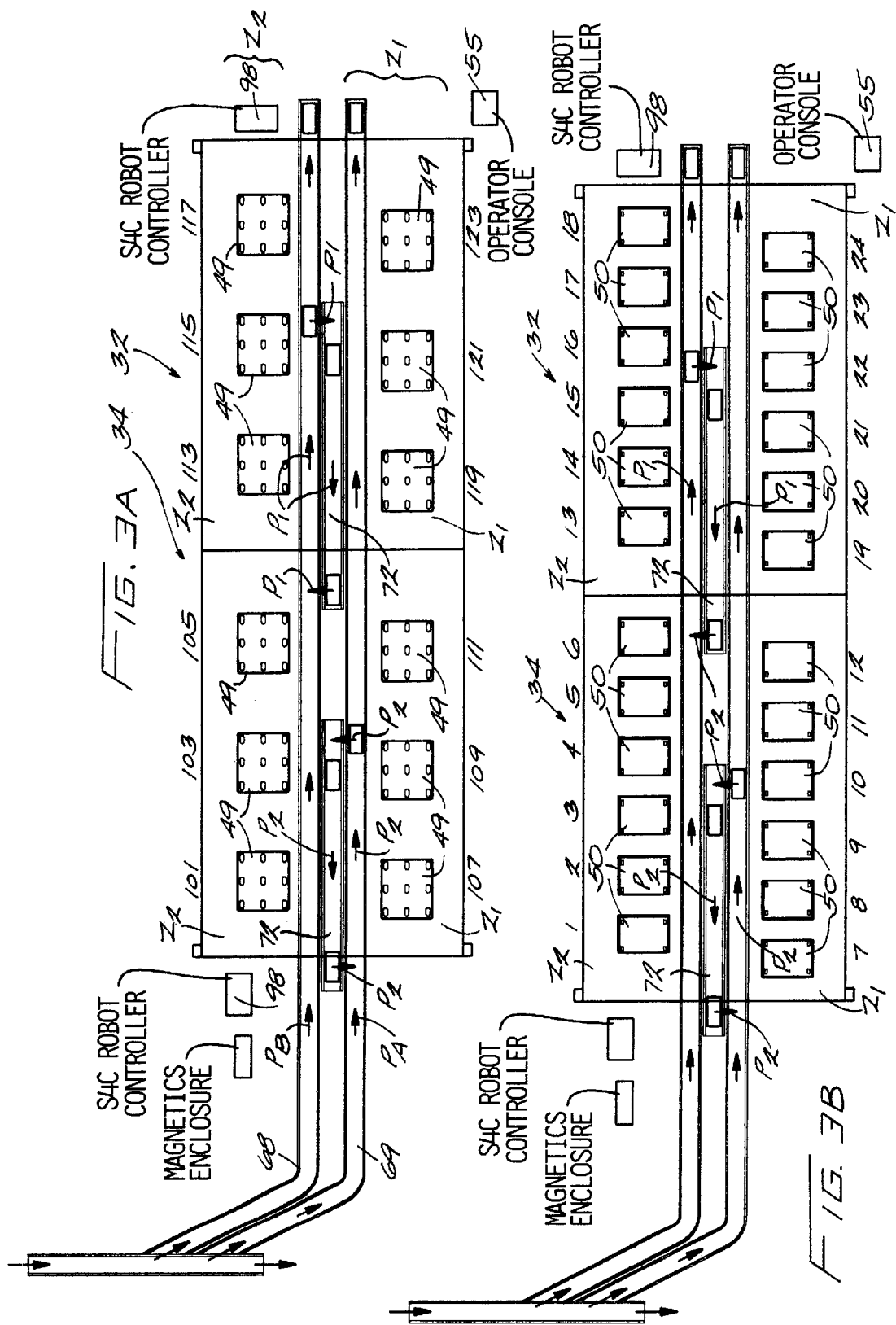

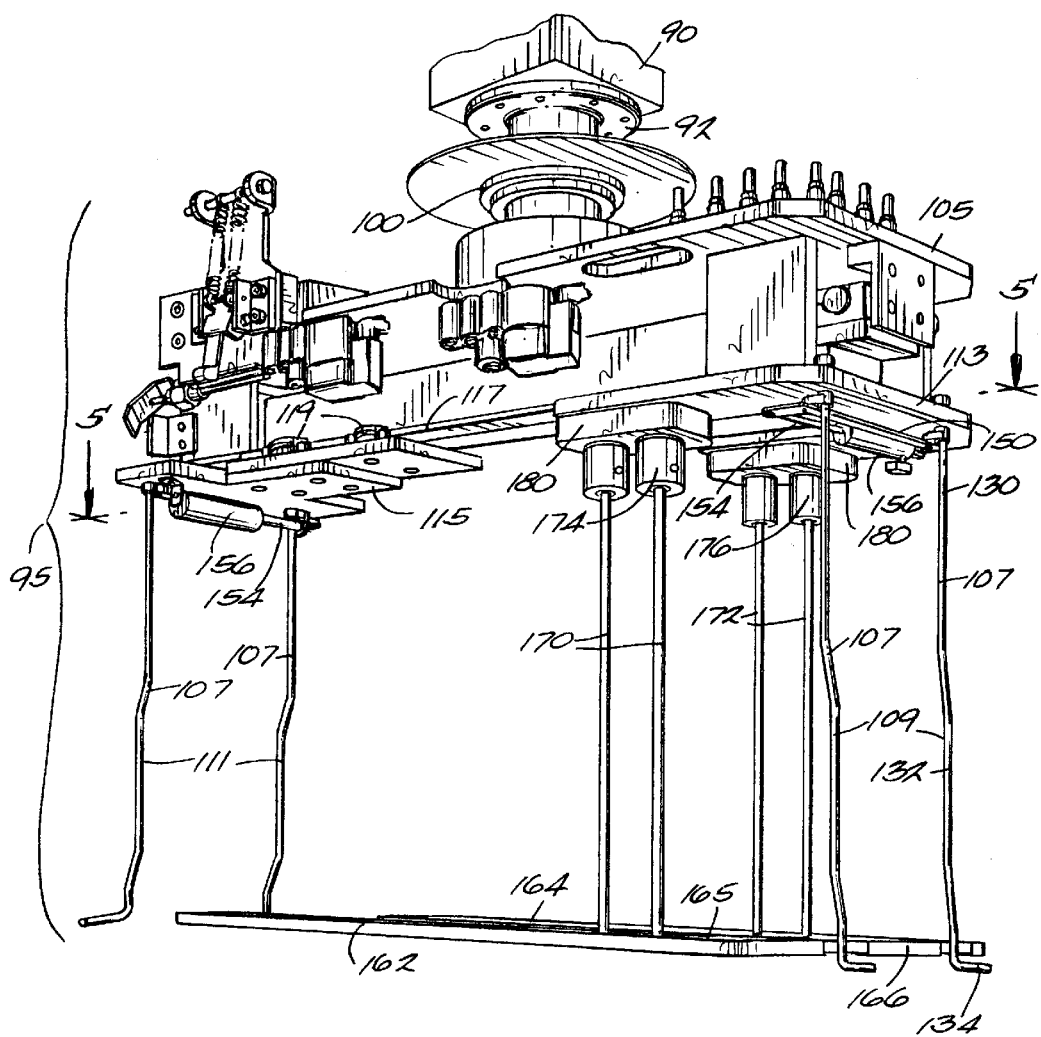

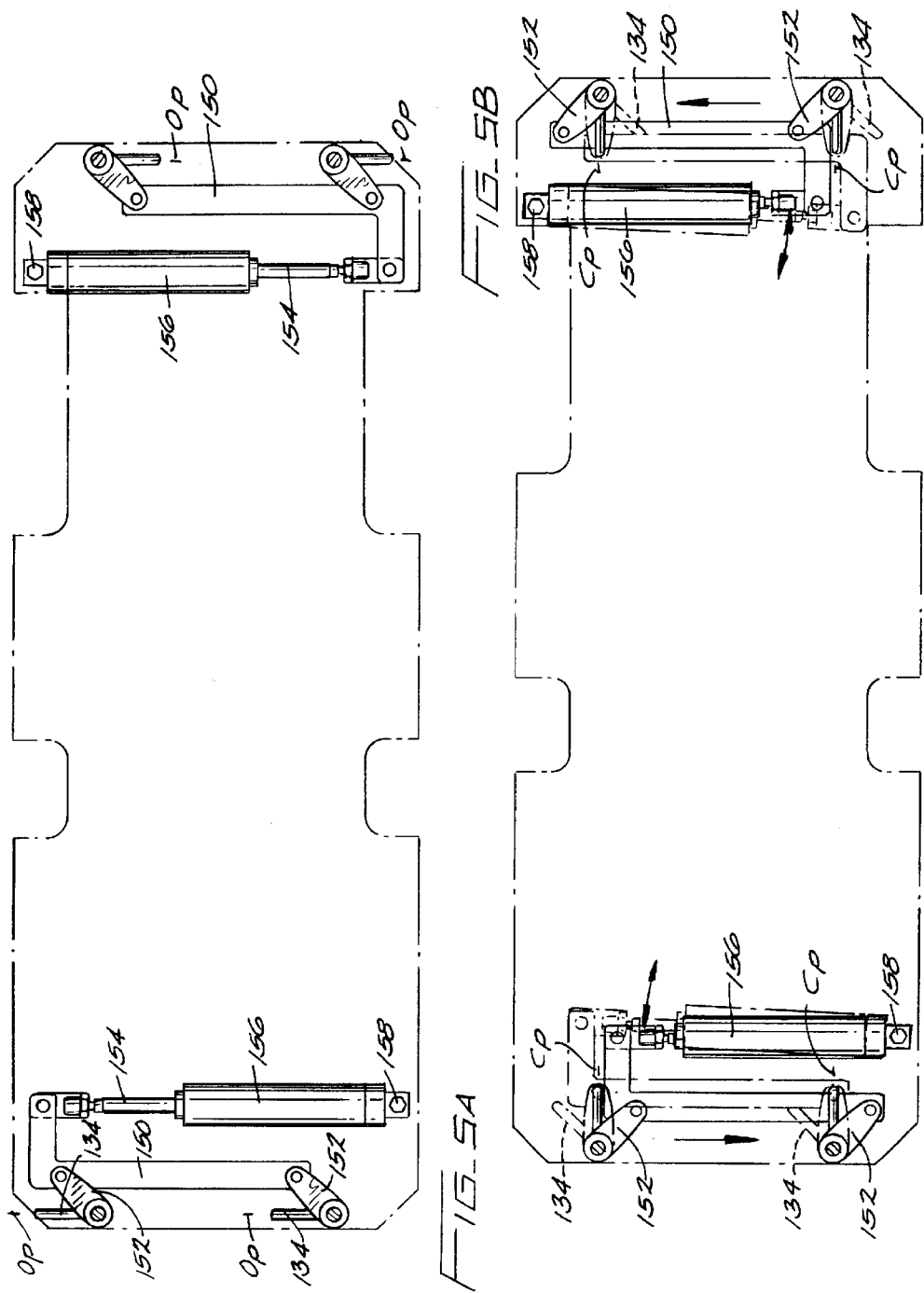

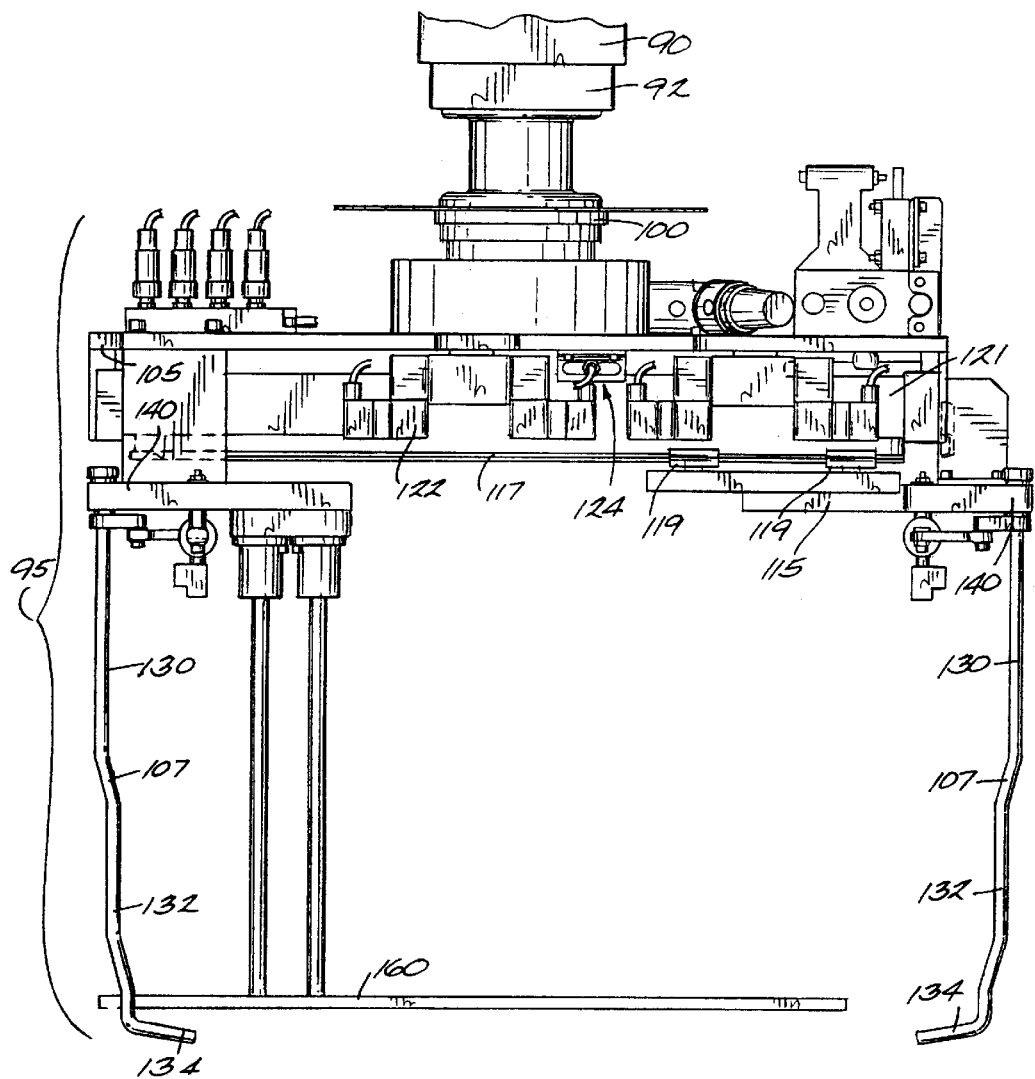
FIG_6

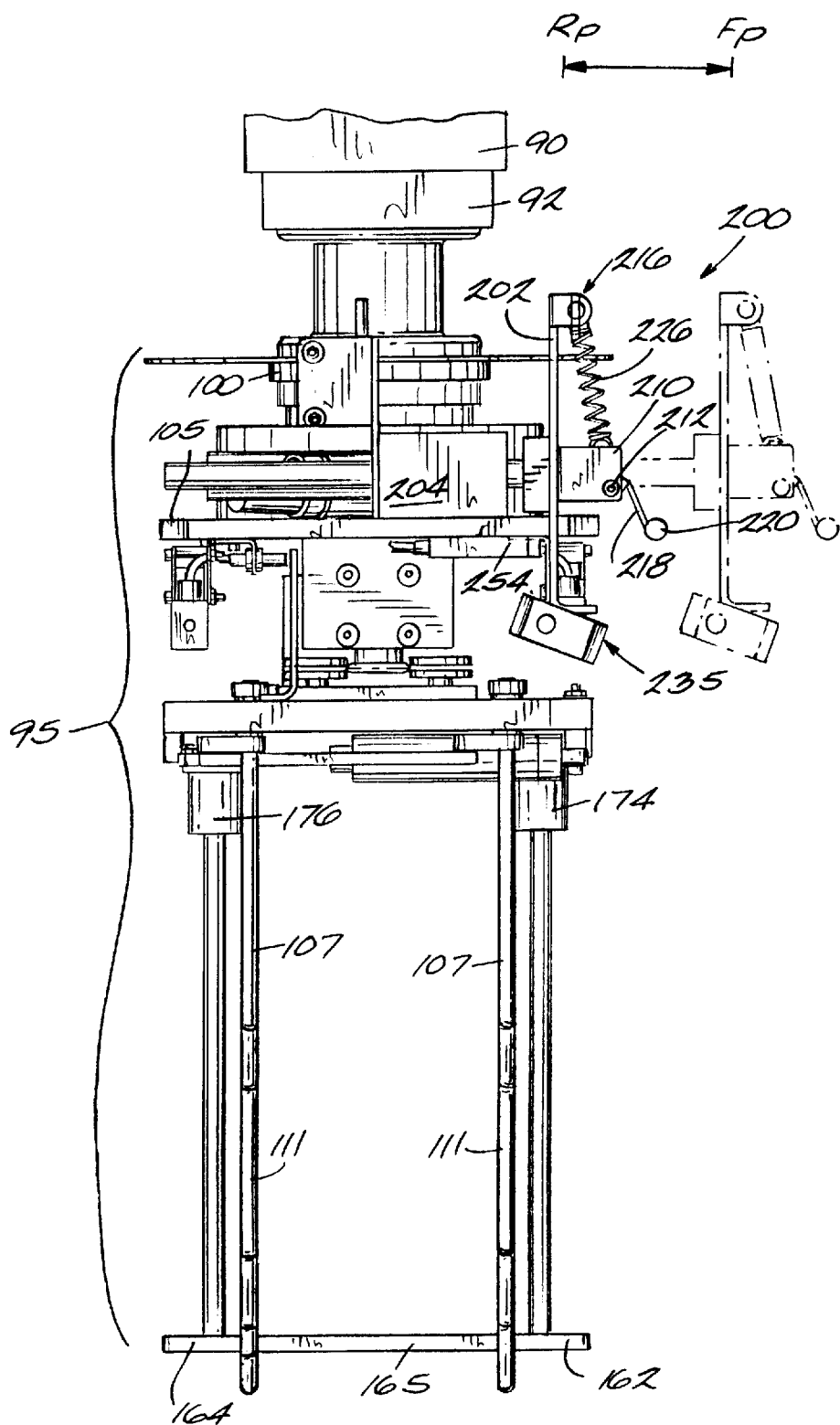

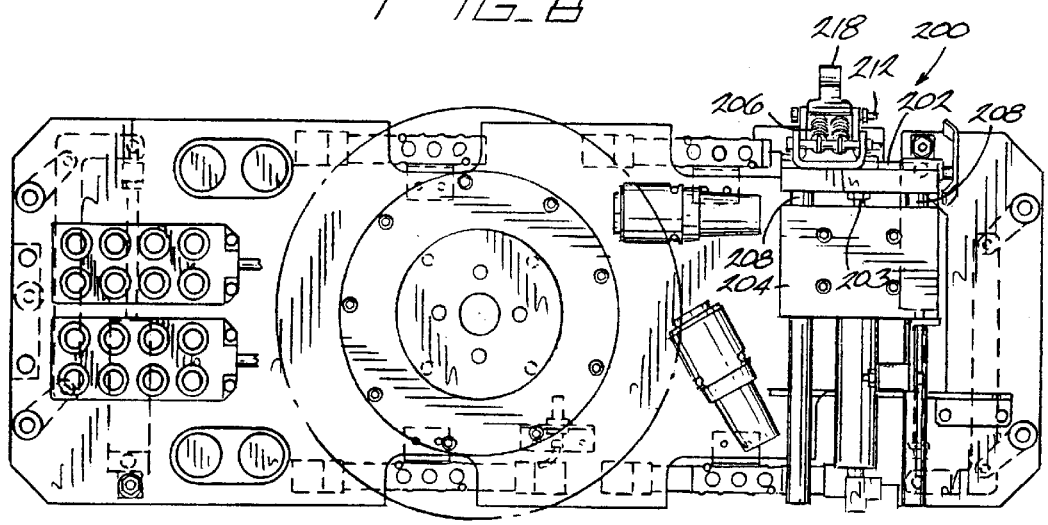
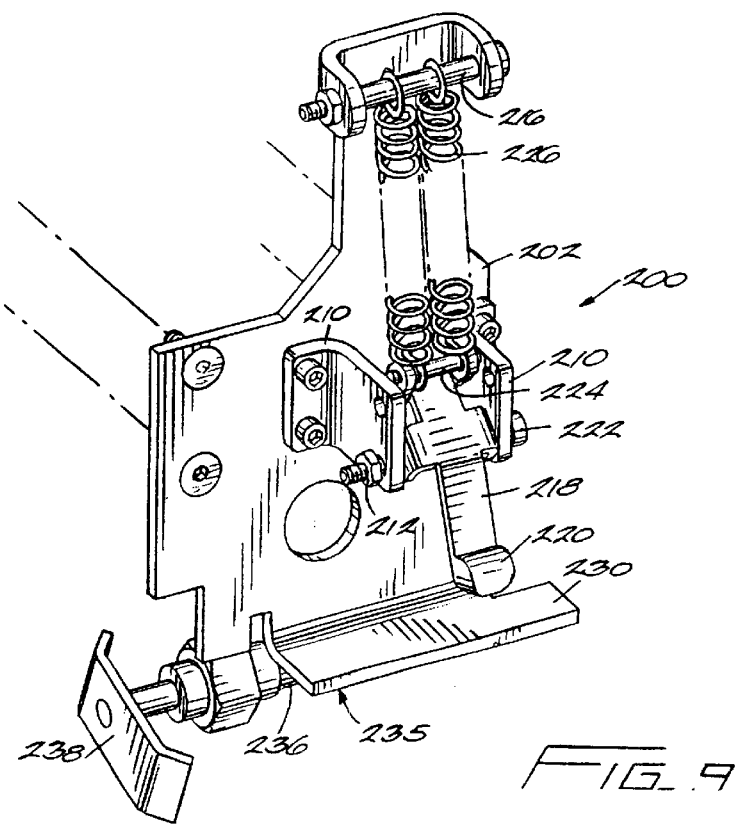

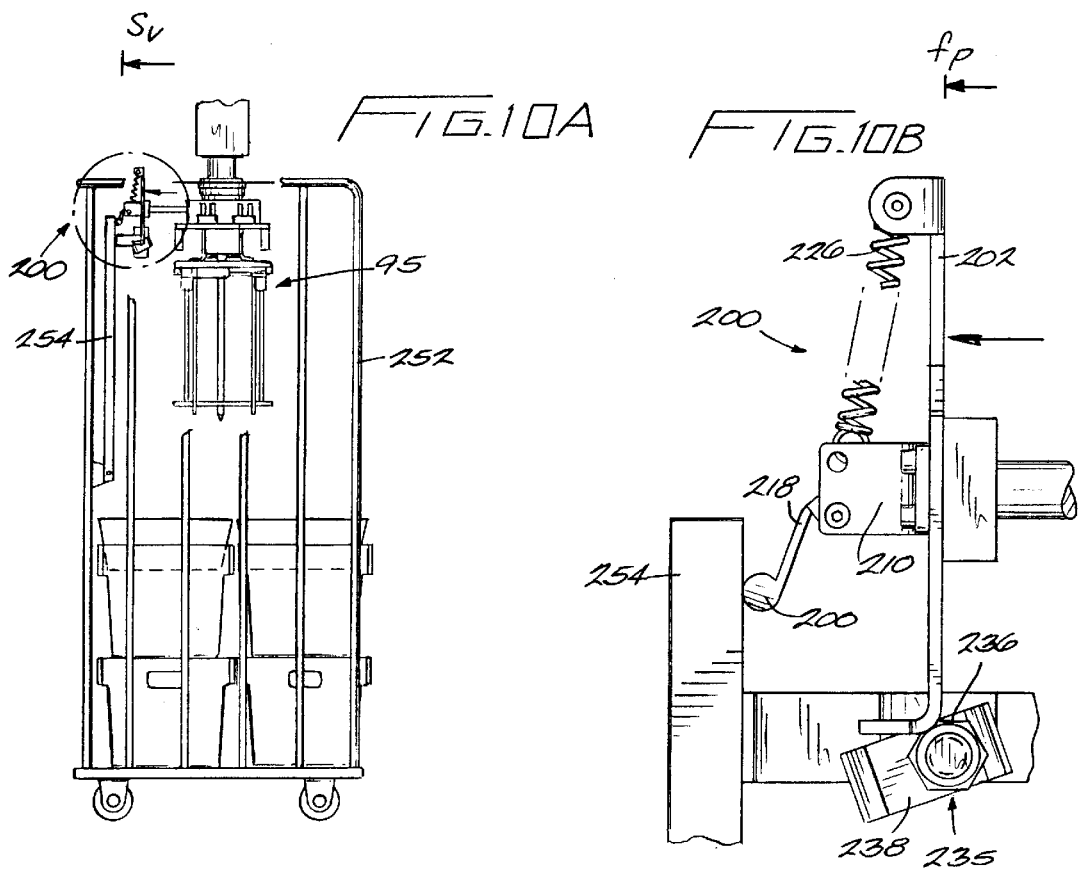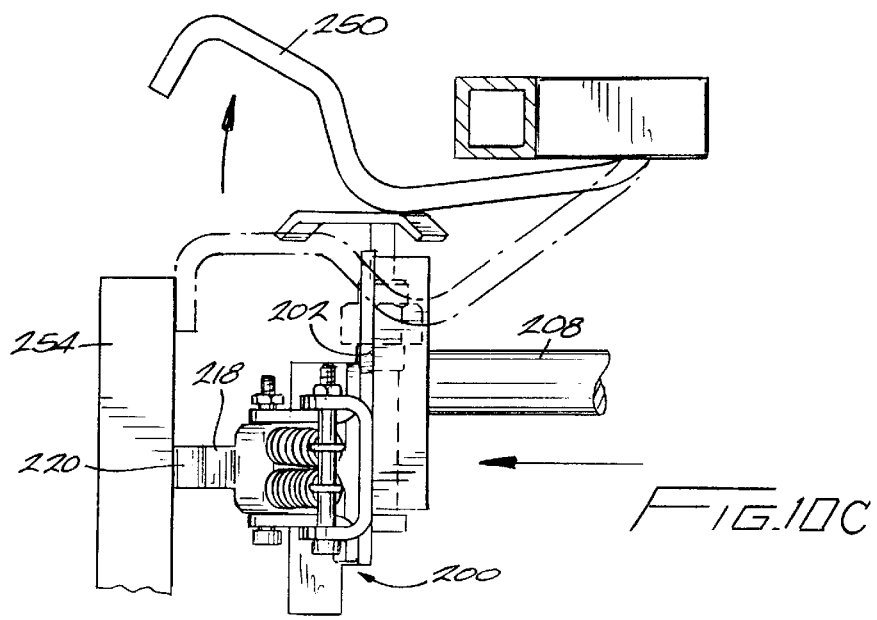

COLUMN STACK

BRICK STACK
FRONT NETTING MUST BE DOWN

CPMC - LOAD SIDE

TOOL POSITION FOR EMM UPPER/LOWER HALF.

CPMC - LOAD SIDE

TOOL POSITION FOR MM UPPER/LOWER HALF.

COLUMN STACK

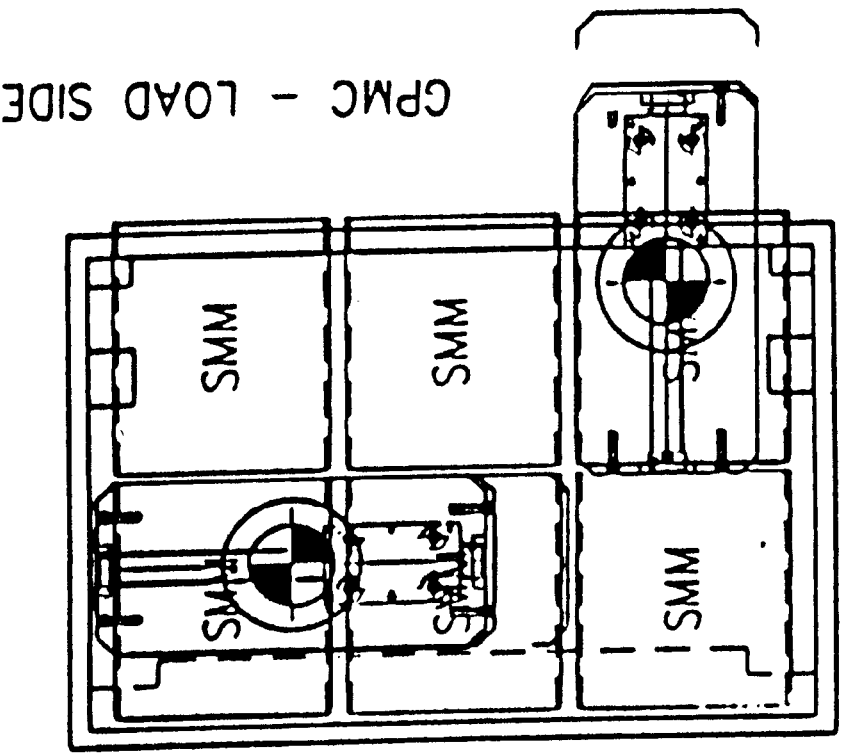

CPMC – LOAD SIDE

TOOL POSITION FOR EMM UPPER/LOWER HALF

CPMC – LOAD SIDE

TOOL POSITION FOR MM UPPER/LOWER HALF.

BRICK STACK

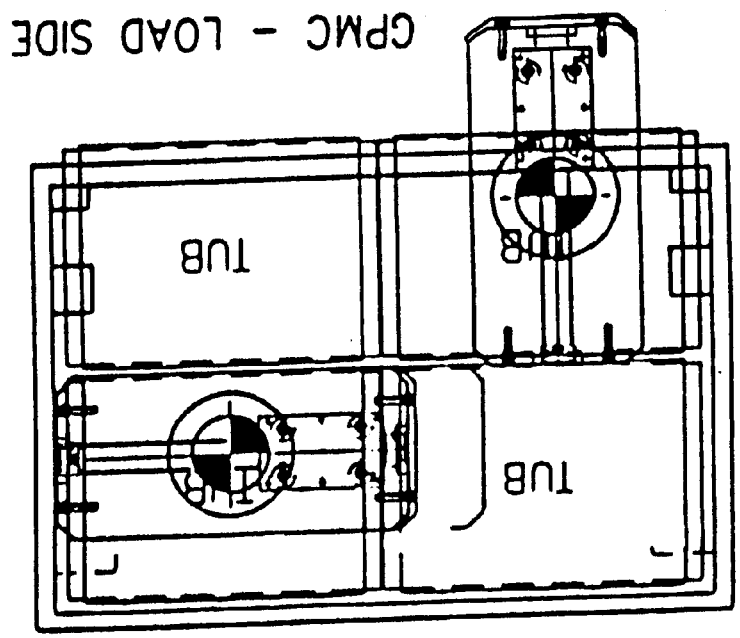
Fig. 12O — TOOL POSITION FOR TUB UPPER/LOWER HALF.
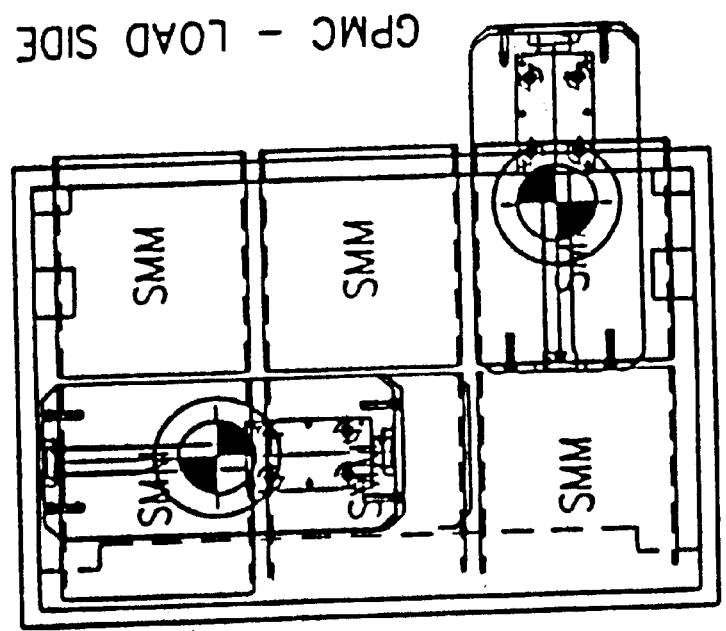
Fig. 12N — TOOL POSITION FOR SMM UPPER/LOWER HALF.

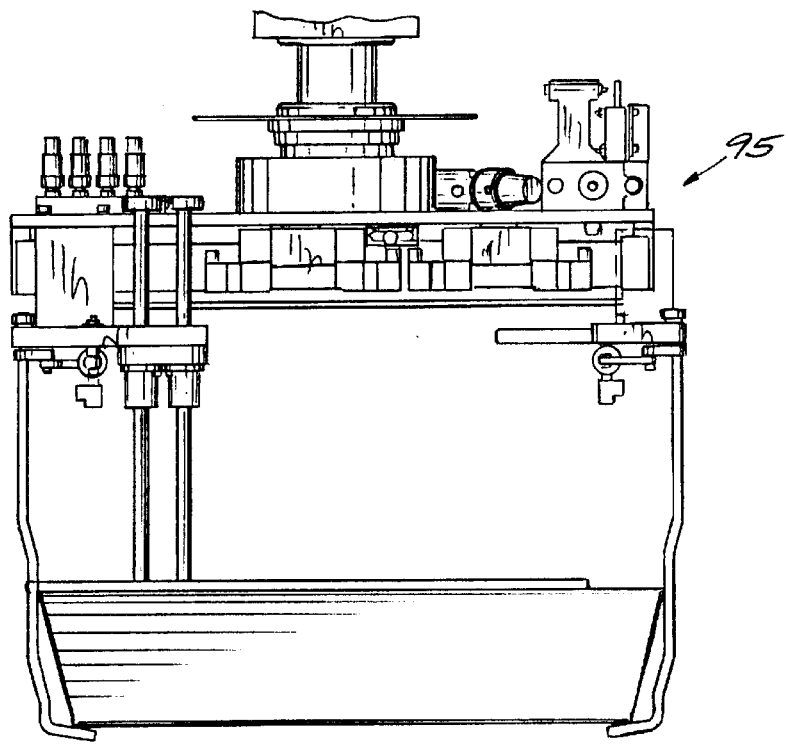
FIG_13A
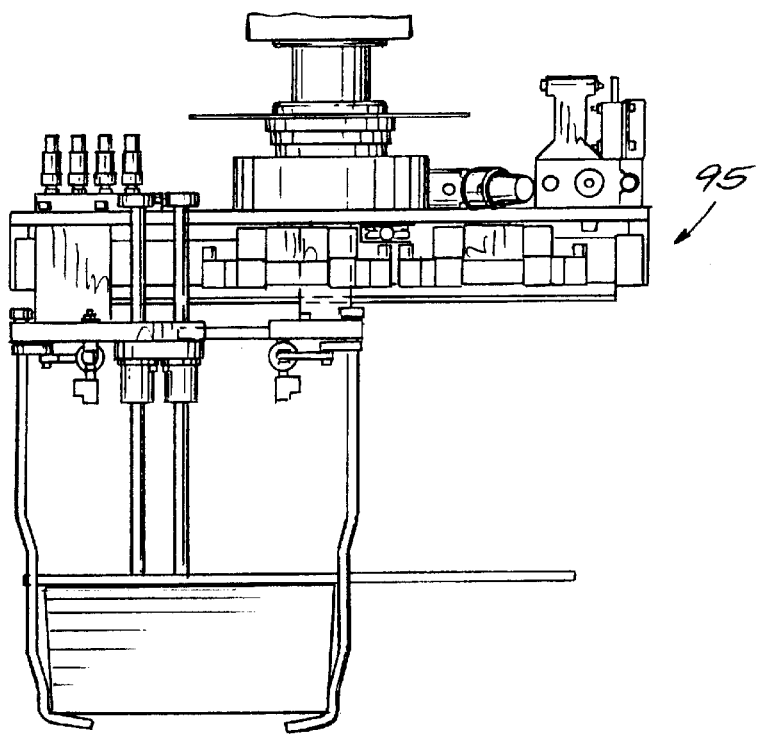
FIG_13B

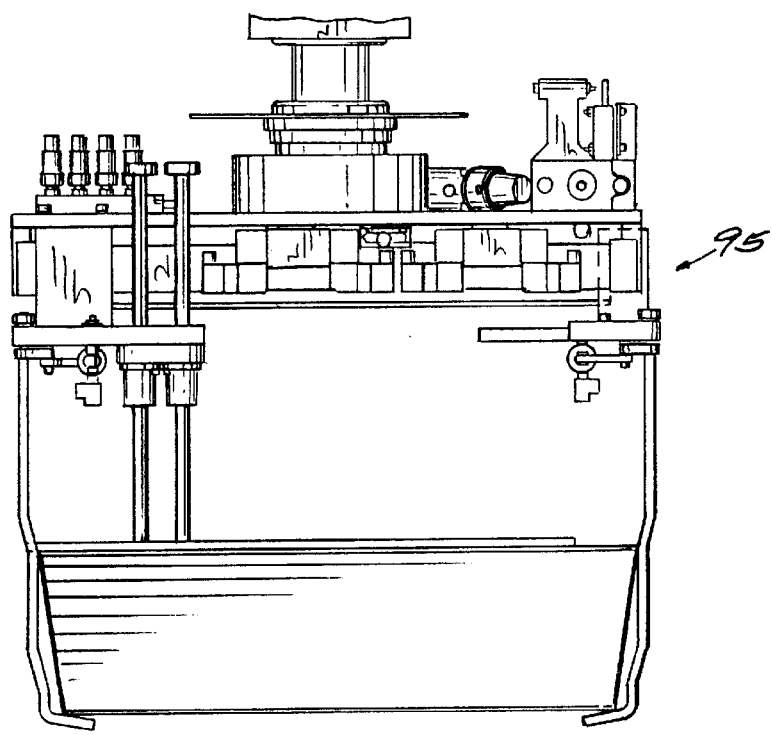
FIG_14A
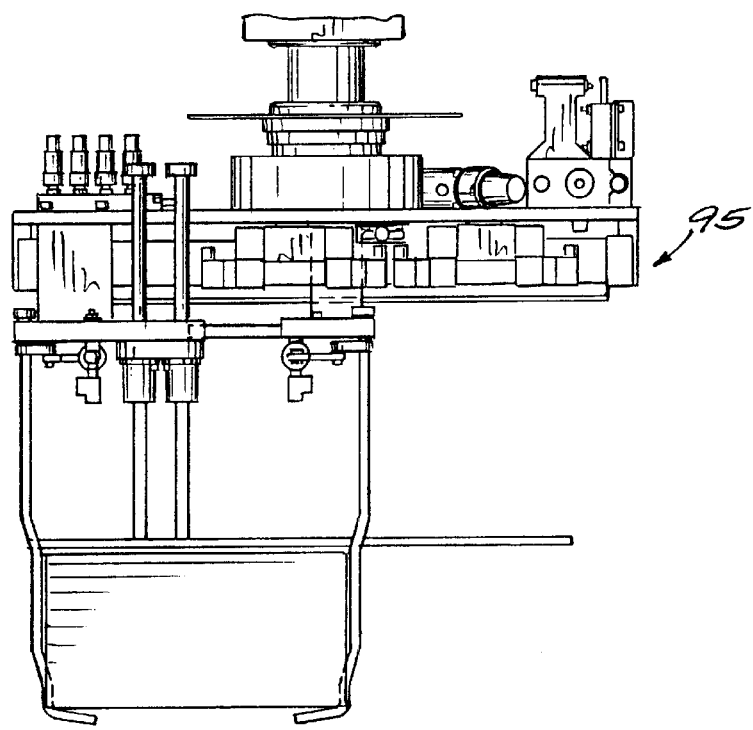
FIG_14B

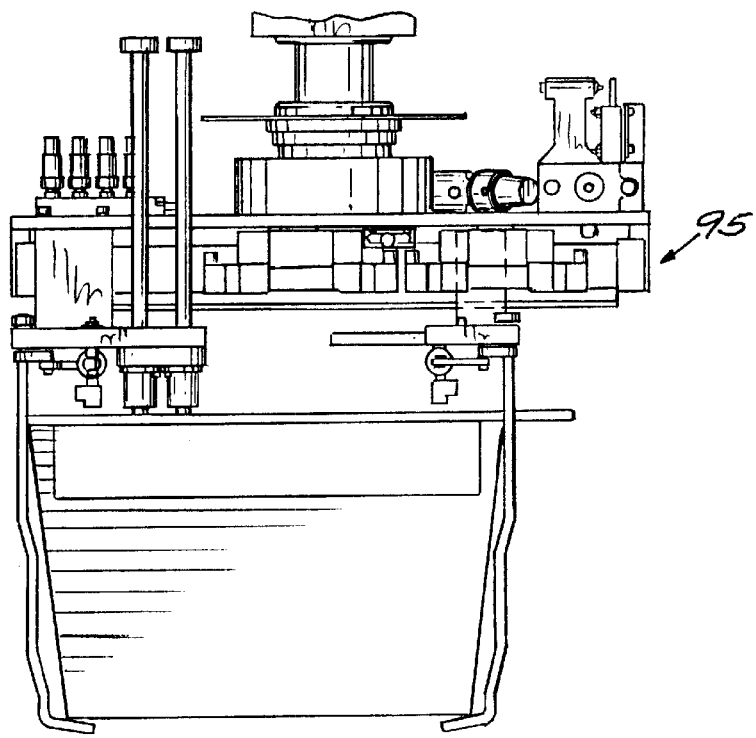
FIG_15A
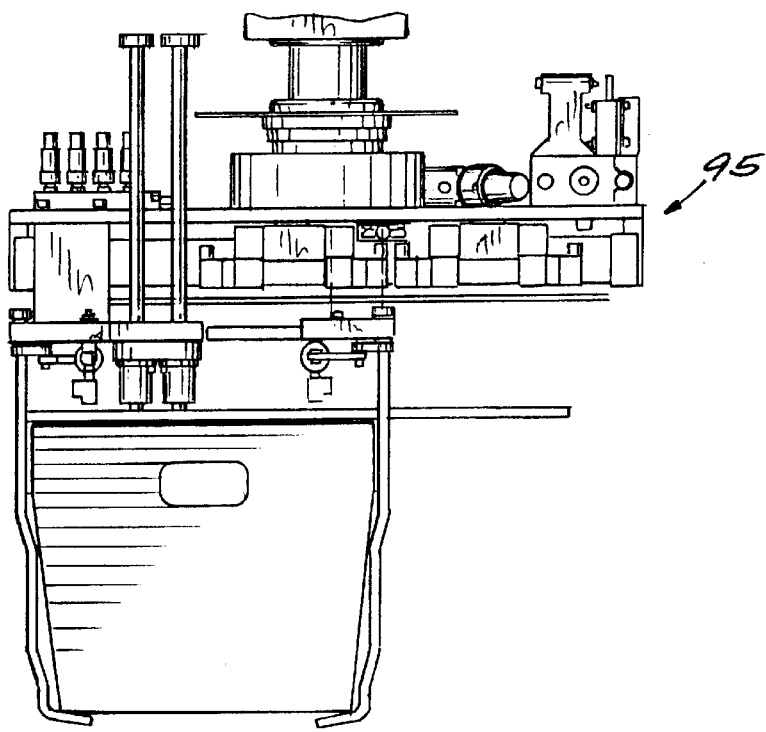
FIG_15B

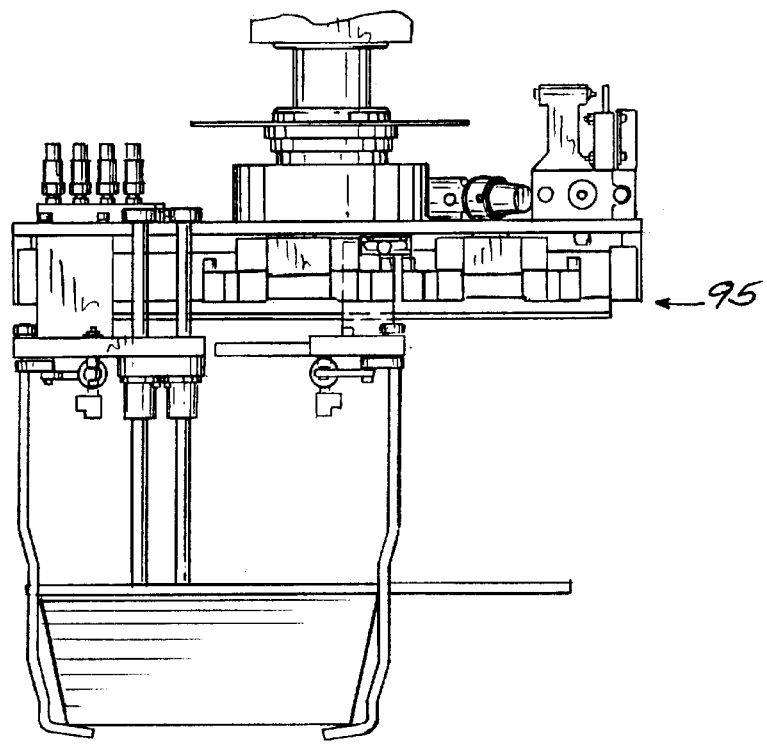
FIG_16A
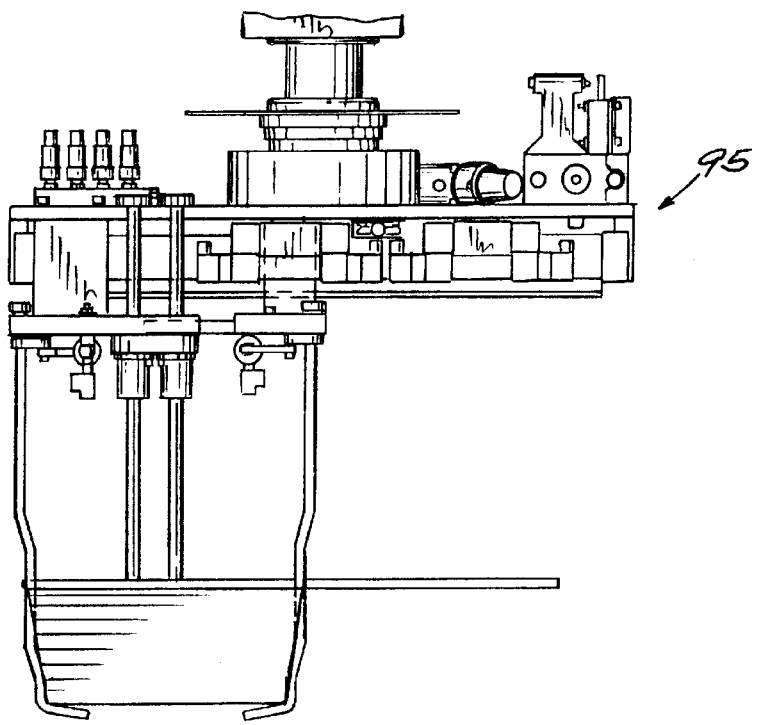
FIG_16B

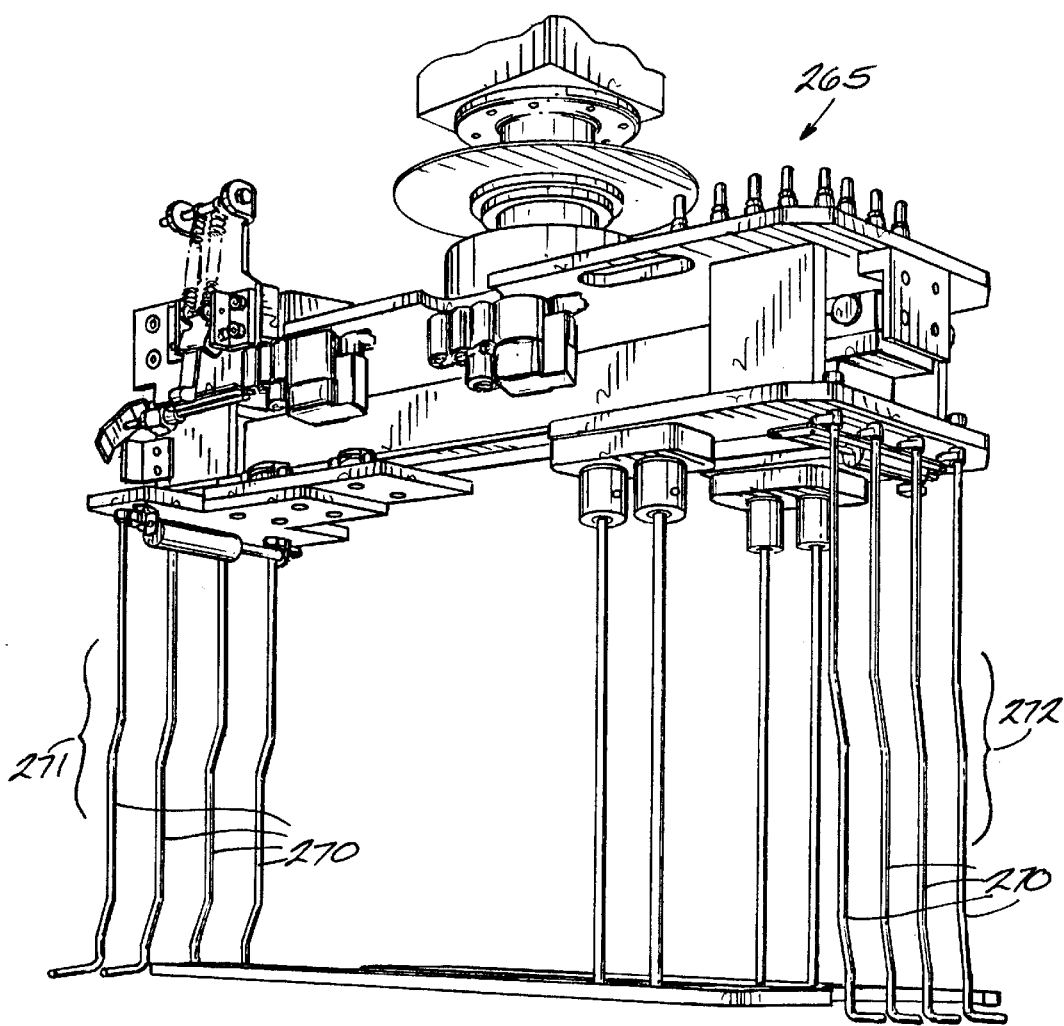

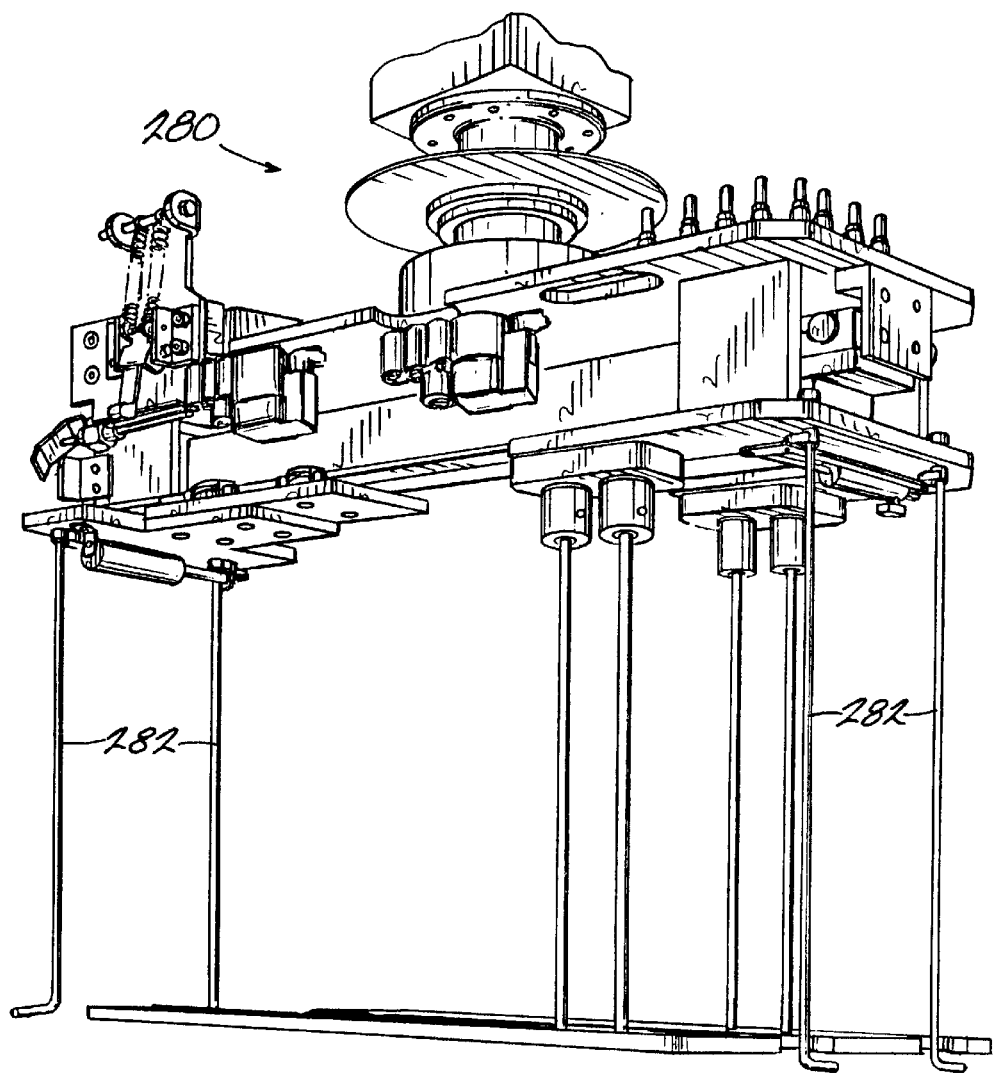
FIG_18

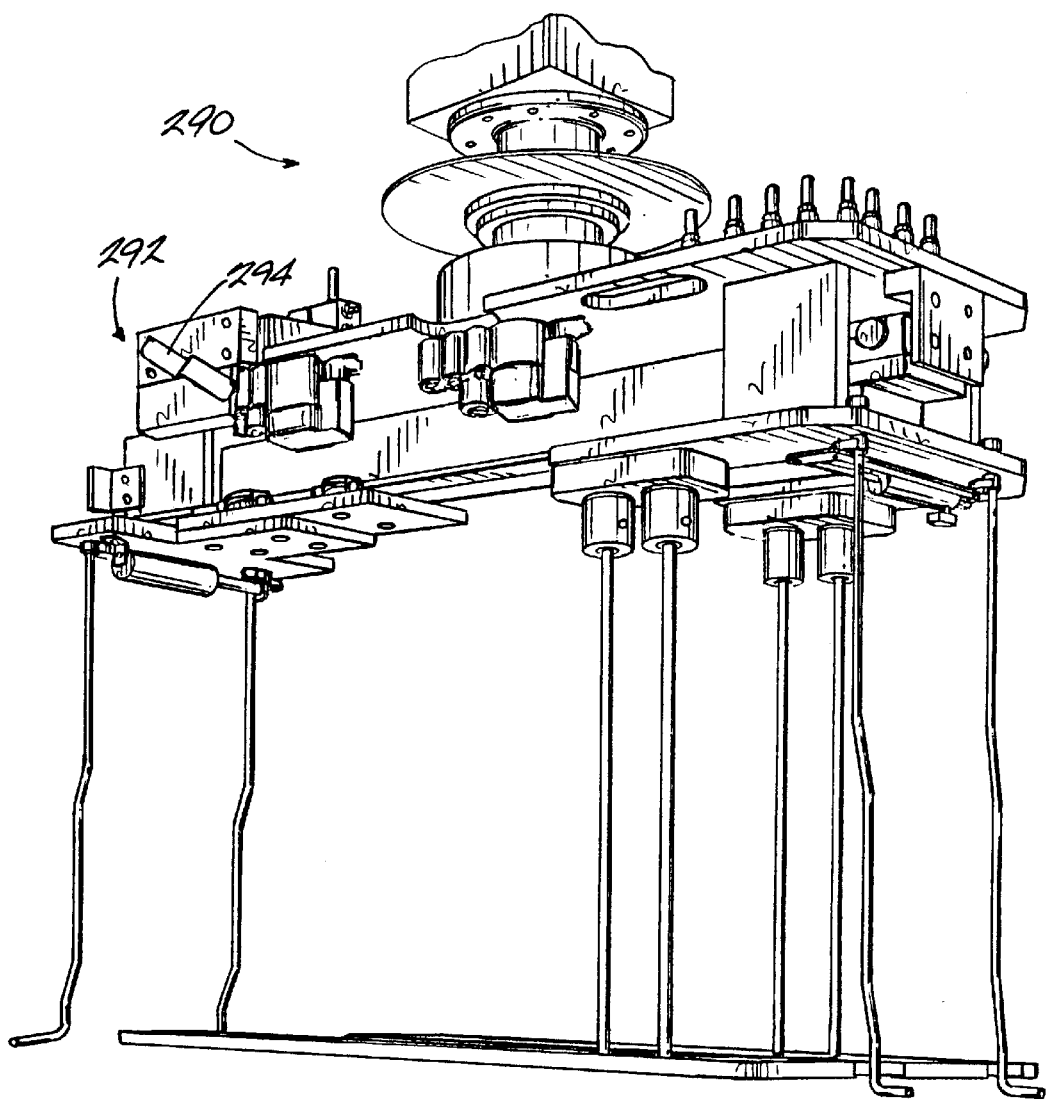
FIG_19.

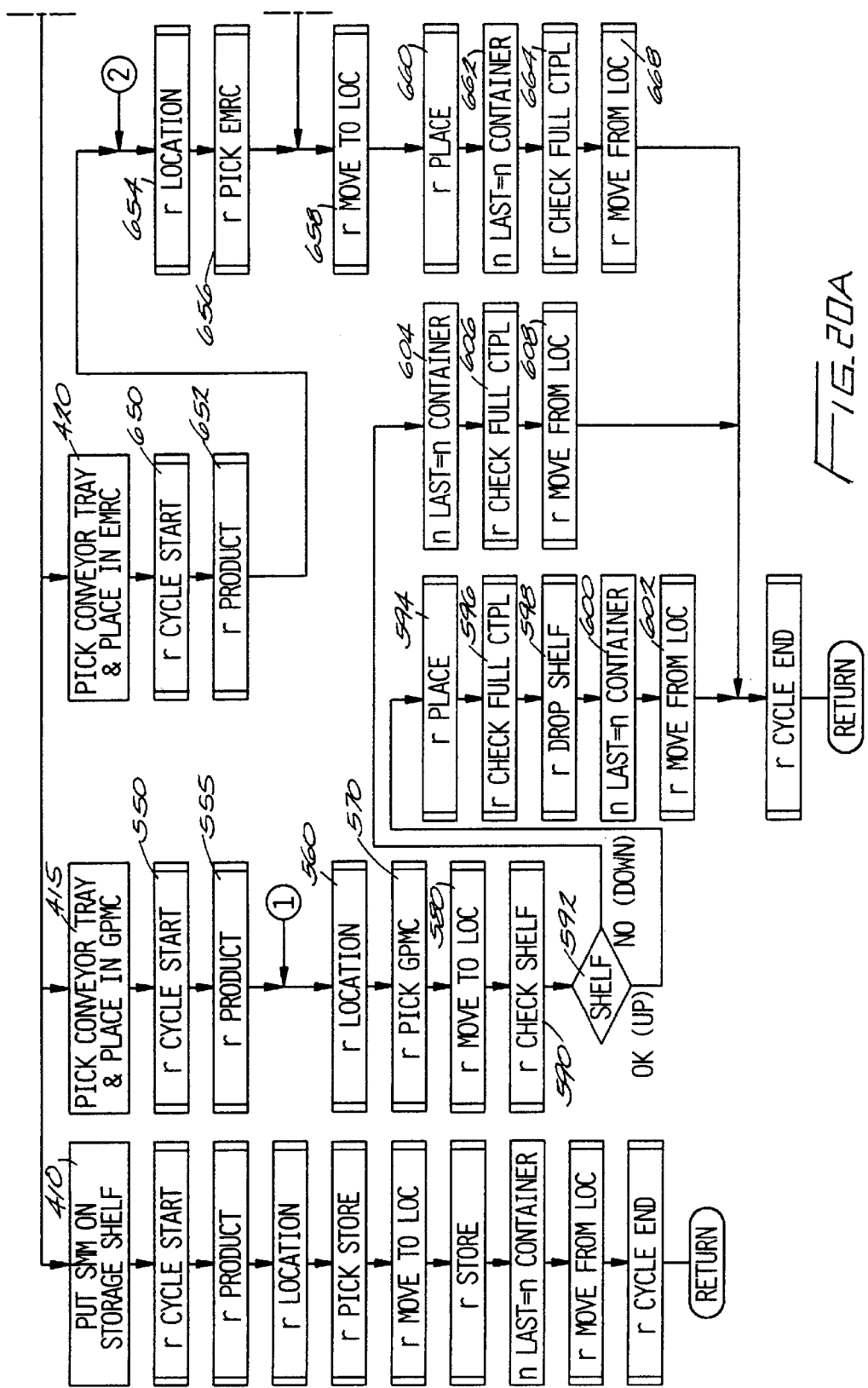

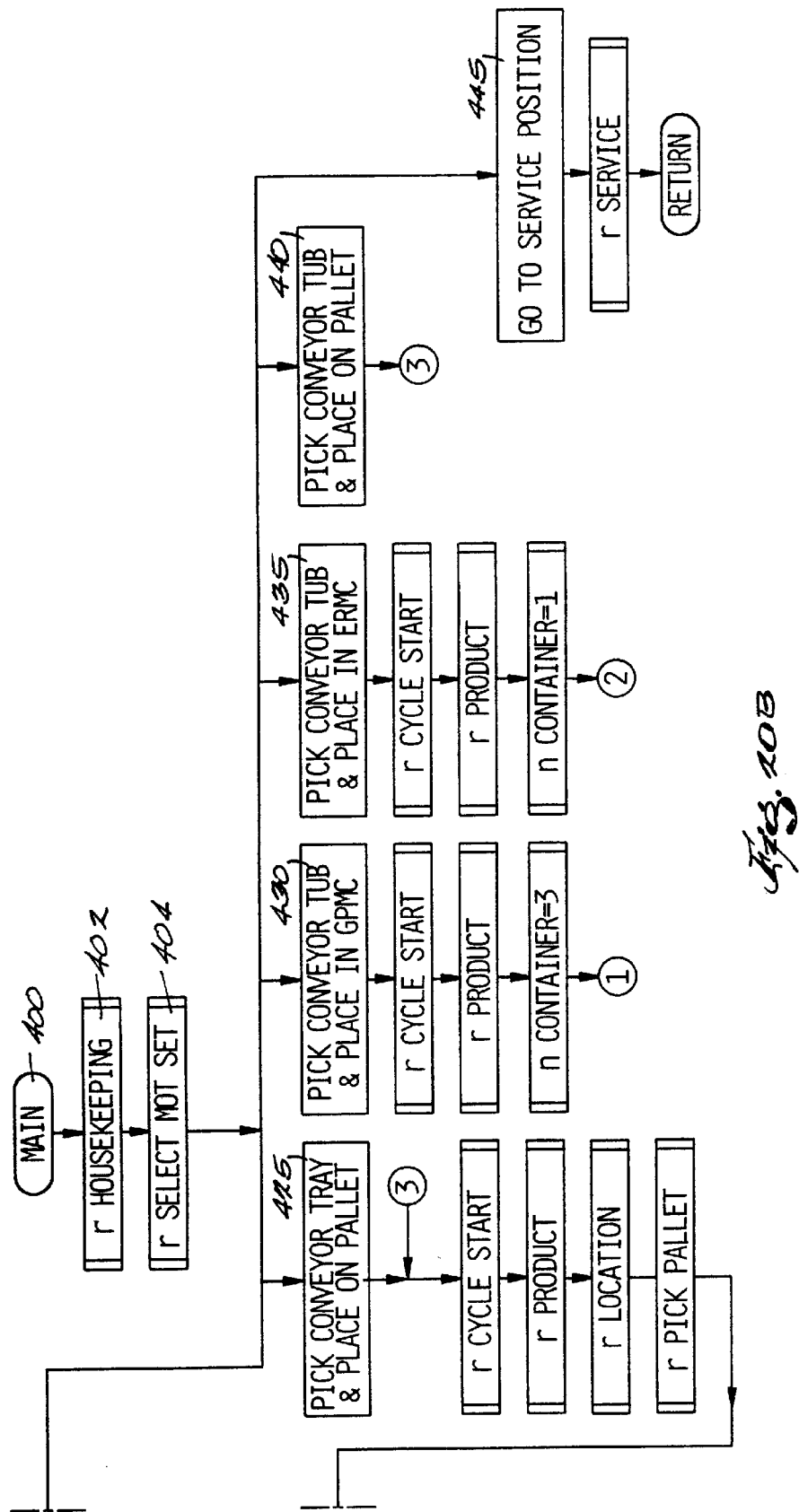

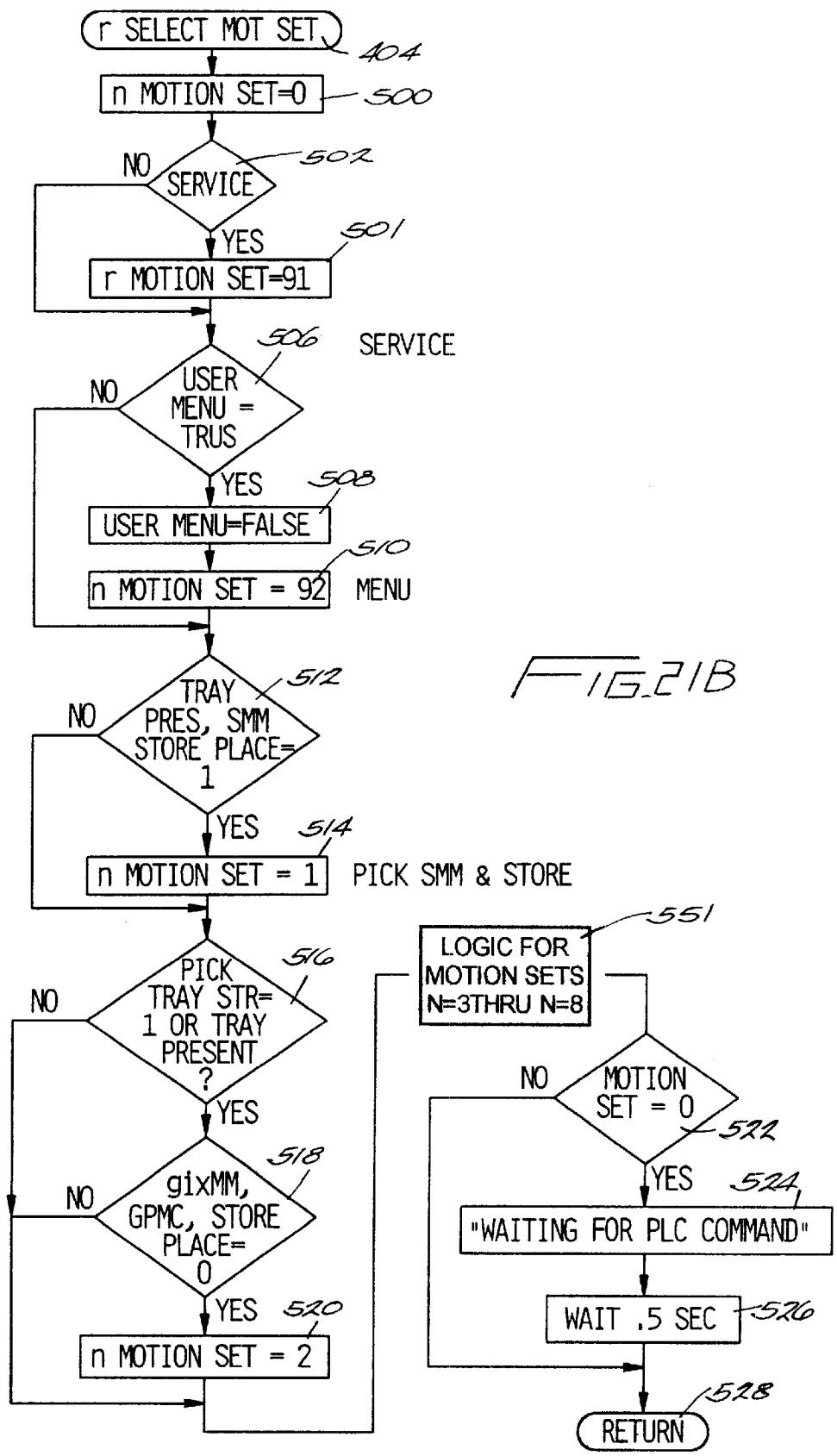

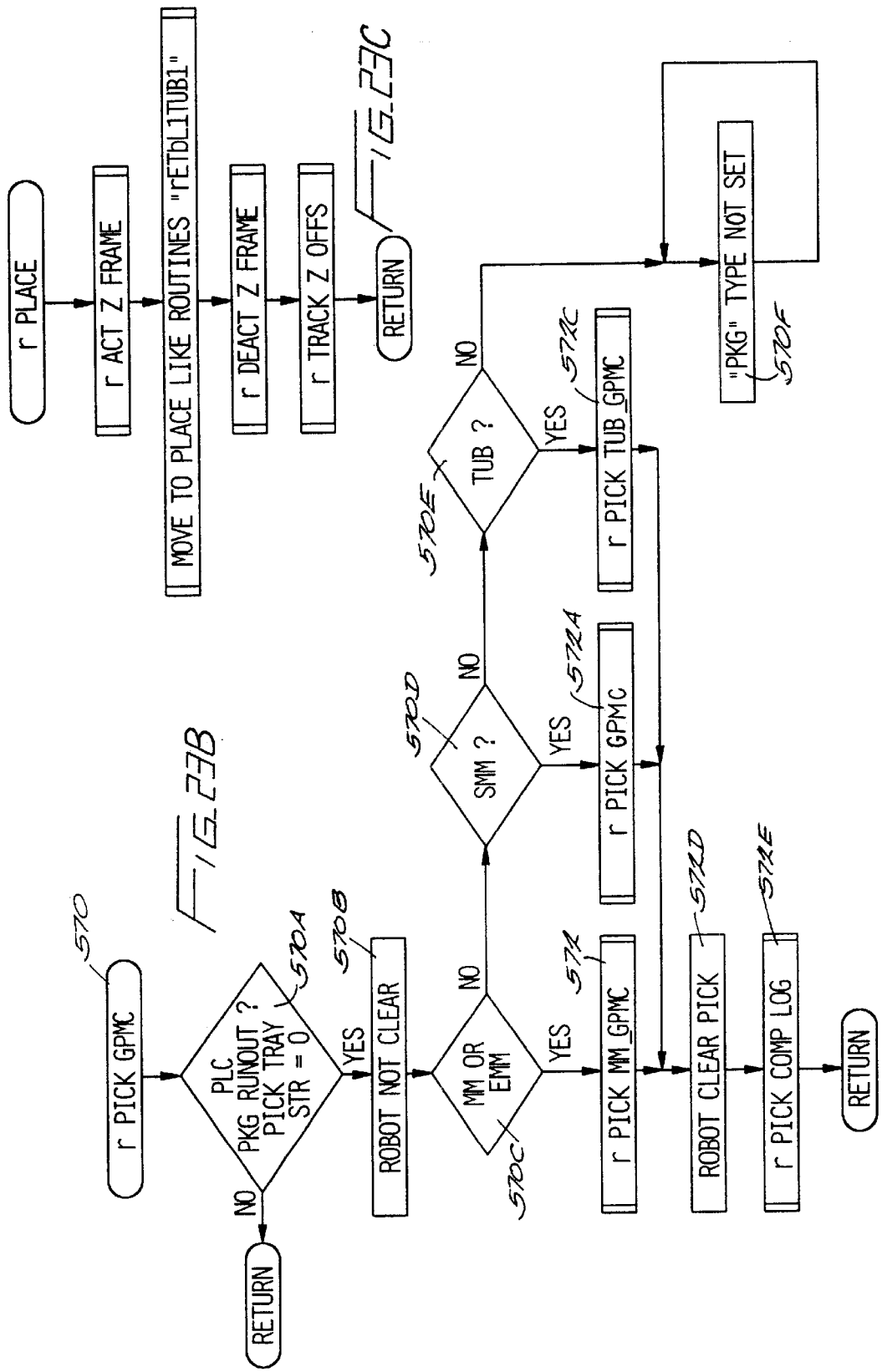

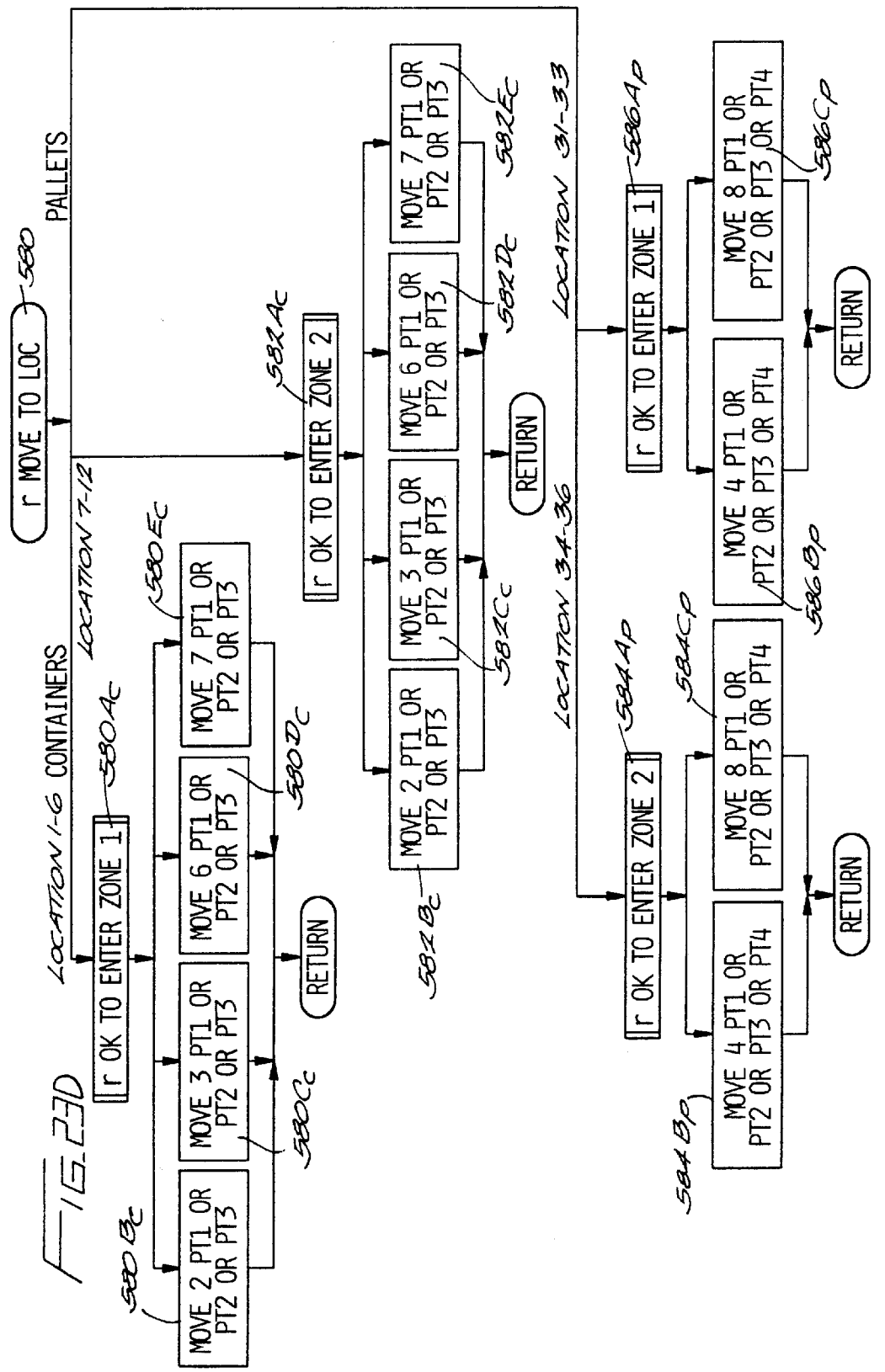

ROBOTIC CONTAINERIZATION AND PALLETIZING SYSTEM

This application claims the benefit of U.S. Provisional Application No. 60/124,427, filed on Mar. 15, 1999.

FIELD OF THE INVENTION

The present invention relates to systems and devices used to load containers and pallets. More particularly, the present invention relates to a robotic system used to load mail trays and tubs of different shapes and sizes on pallets and into wheeled containers and carts.

BACKGROUND OF THE INVENTION

Millions of pieces of mail are deposited with the postal service every day. The deposited mail is sorted, generally by zip or other code, and shipped to the proper destination. Generally, the sorting process involves placing mail with the same or related codes into tubs or trays. Thus, each tub or tray will contain mail addressed to geographically proximate locals. The tubs and trays are then placed on pallets and carts and the pallets and carts are loaded on trucks or other vehicles for shipment to their appropriate destinations.

Some parts of this process have been automated, including the sorting of mail by zip code. However, the loading of tubs and trays onto pallets and carts is generally done by hand. While hand or manual loading accomplishes the desired result, it requires postal staff to be engaged in physically demanding and tedious work. Moreover, the speed at which pallets and carts can be loaded is limited by the speed at which the human body can operate and the number of people that can economically be employed to carry out the task. With ever increasing mail demands, faster, more efficient methods of loading pallets and containers with mail tubs and trays are needed.

SUMMARY OF THE INVENTION

Accordingly, the present invention provides an automated system for loading pallets and containers with mail trays and tubs. The present invention may be implemented in a system that in one embodiment includes two cells, each with a gantry robot, although the invention can be implemented with one cell. Each cell includes an open frame that is secured to a hard surface such as the concrete floor of a building. The sides of the frame may be enclosed with a mesh. A number of doors are provided in the mesh walls to provide access to the interior of the cell. The top of the cell is open and includes two tracks on which the robot travels. The robot is mounted on the cell such that it can move in a horizontal plane along two axes. A conveyor system for trays and tubs passes through the cells.

The robot includes a robot arm that is extendible in a vertical plane which is perpendicular to the plane in which the robot moves. A mechanical wrist is coupled to the end of the robot arm and an end effector or gripper is mounted on the wrist. In one embodiment, the gripper includes a plurality of fluid-actuated offset fingers that are used to lift trays and tubs firm the conveyor system and deliver them to wheeled containers, carts, and pallets. The gripper can accommodate a variety of mail trays, flats, and tubs, including United States Postal Service ("USPS") Managed Mail ("MM"), Extended Managed Mail ("EMM"), and Short Managed Mail ("SMM") trays. The mail trays and tubs can be delivered by the gripper with or without outer sleeves and straps. The trays and tubs are delivered to a variety of containers and pallets including USPS Eastern Region Mail Carts ("ERMCs"), General Purpose Mail Carts ("GPMCs"), USPS pallets, and other similar pallets.

The offset-finger gripper is designed to grasp the mail trays/tubs from the sides and bottom. The fingers rotate 90 degrees to release the grasped tray/tub when the clamp cylinder is relaxed. The gripper uses a multiple pressure clamp cylinder which allows the selection of high or low clamp force to accommodate and adjust to heavy tubs and lightweight trays. The gripper also includes a valve and proximity switch, which permit the clamp cylinder to be adjusted at both an intermediate open position and a full open position. This feature allows the robot to pick up a tray/tub from a direction perpendicular to the product's long axis. It also shortens clamp travel to close, improving speed performance and system throughput.

The present invention utilizes a top-loading technique. Mail containers are approached from the top and loaded into carts and onto pallets in a similar fashion. Top loading requires less room for the gripper to actuate and, thus, reduces the floor space needed for the system. A top loading system has several other advantages, including the ability to load open-top carts without opening or removing side doors or side netting (although doors and netting on at least one side of the cart, Such as the front, should be removed). However, in a top-loading system the height of the first level or layer of product (trays/tubs) must be known so that subsequent layers or levels may be loaded on top of it. Accordingly, the gripper is designed to detect and measure the delivered tray/tub height in the cart or on the pallet with which it is placed.

The present invention includes a mail containment plate to make height measurements. The plate is a gravity plate and moves vertically along bearing rods. Height measurements are made using a proximity switch and target and vertical robot travel values. Initially, the plate is raised when a tray or tub is located in the gripper. The robot then moves to a known height drop-off destination inside a cart or at a pallet. The gripper releases the tray or tub, which will settle on or nest in the tray or tub, if any, below it. The robot executes a vertical move upward and starts a measurement process while the containment plate stays in place on top of the mail in the delivered tray or tub. A proximity sensor senses a switch target when the end of the vertical plate travel has been reached. The current vertical position of the robot's wrist is recorded in memory. The final delivered height of the tray or tub is now known and the next layer to be delivered is adjusted by the robot program to accommodate the previous height or position of the delivered mail tray or tub. In addition to its use in taking measurements, the containment plate also helps to prevent loose mail in unsleeved trays/tubs from falling out of the trays/tubs during robotic transportation.

In addition to the features described above, the present invention includes a feature to lower shelves in mail carts. At least one existing mail cart, the GPMC, has a pivotable shelf that is movable between a horizontal and vertical position. When using a top loading technique to load these types of carts, the cart shelf must be lowered after the bottom half of the cart has been loaded with trays/tubs. In order to lower the shelf in a GPMC, the gripper utilizes a shelf-lowering assembly in the form of a slide/cylinder assembly, which extends a shelf handling bracket and spring finger, in one embodiment, and a clip in another, to unlatch and lower the GPMC shelf. Once the slide/cylinder is extended to engage the latching mechanism on the GPMC cart, the shelf lowering process begins. The robot executes programmed moves to release the cart shelf latch while the spring finger engages the shelf to start the downward lowering motion as the shelf rests on the handling bracket. If the operation is unsuccessful due to a malfunction or jamming situation, the spring finger disengages the shelf and springs back to its original position without damage to the finger. A photoelectric sensor determines that the shelf lowering operation has been successful by checking the presence of the shelf at various stages in the lowering process.

These are just some of the features and advantages of the present invention. Others will become apparent by a review of the drawings and details described below.

BRIEF DESCRIPTION OF THE DRAWINGS

FIG. 1 is a partially exploded, perspective view of the system of the present invention.

FIG. 2A is a schematic diagram, illustrating the architecture of the control system used in the present invention.

FIG. 2B is a schematic representation of the system of the present invention as might be presented on a display device used by a system operator.

FIG. 3A is a schematic, top view of the system of the present invention configured to load pallets.

FIG. 3B is a schematic, top view of the system of the present invention configured to load carts.

FIG. 4 is a perspective view of one embodiment of a gripper used in the system of the present invention.

FIG. 5A is a simplified, bottom perspective view of the gripper shown in FIG. 4 taken along the line 5—5.

FIG. 5B is a simplified, bottom perspective view of the gripper as in FIG. 5A showing the finger actuators in a second position.

FIG. 6 is a side view of the gripper shown in FIG. 4.

FIG. 7 is an end view of the gripper shown in FIG. 4 illustrating the movement of a shelf-lowering assembly thereof.

FIG. 8 is a top view of the gripper shown in FIG. 4.

FIG. 9 is a perspective view of the shelf-lowering assembly.

FIG. 10A is a side view of the first embodiment of the shelf-lowering assembly preparing to lower a shelf on a mail cart.

FIG. 10B is an enlarged view of the first embodiment of the shelf-lowering assembly grasping a shelf on a mail cart.

FIG. 10C is a top view of the first embodiment of the shelf-lowering assembly releasing the shelf latch.

FIG. 13A is a side view of the gripper of the present invention grasping a standard managed mail tray.

FIG. 13B is an end view of the gripper of the present invention grasping a standard managed mail tray.

FIG. 14A is a side view of the gripper of the present invention grasping an extended managed mail tray.

FIG. 14B is an end view of the gripper of the present invention grasping an extended managed mail tray.

FIG. 15A is a side view of the gripper of the present invention grasping a mail tub.

FIG. 15B is an end view of the gripper of the present invention grasping a mail tub.

FIG. 16A is a side view of the gripper of the present invention grasping a short managed mail tray.

FIG. 16B is an end view of the gripper of the present invention grasping a short managed mail tray.

FIG. 17 is a perspective view of a second embodiment of the gripper of the present invention.

FIG. 18 is a perspective view of a third embodiment of the gripper of the present invention.

FIG. 19 is a perspective view of the gripper of the present invention equipped with an alternative shelf-lowering mechanism.

FIGS. 20A and B are flow charts illustrating the main program executed by the robot control system.

FIG. 21B is a flow chart illustrating the motion set routine of the main program.

FIG. 23B is a flow chart illustrating the routine for placing an item in a second type of cart.

FIG. 23C is a flow chart illustrating the routine for tracking motion of the containment plate of the end effector of the present invention.

FIG. 23D is a flow chart illustrating the routine for moving the robot to a bay or location within a cell.

DESCRIPTION

Figure 24:
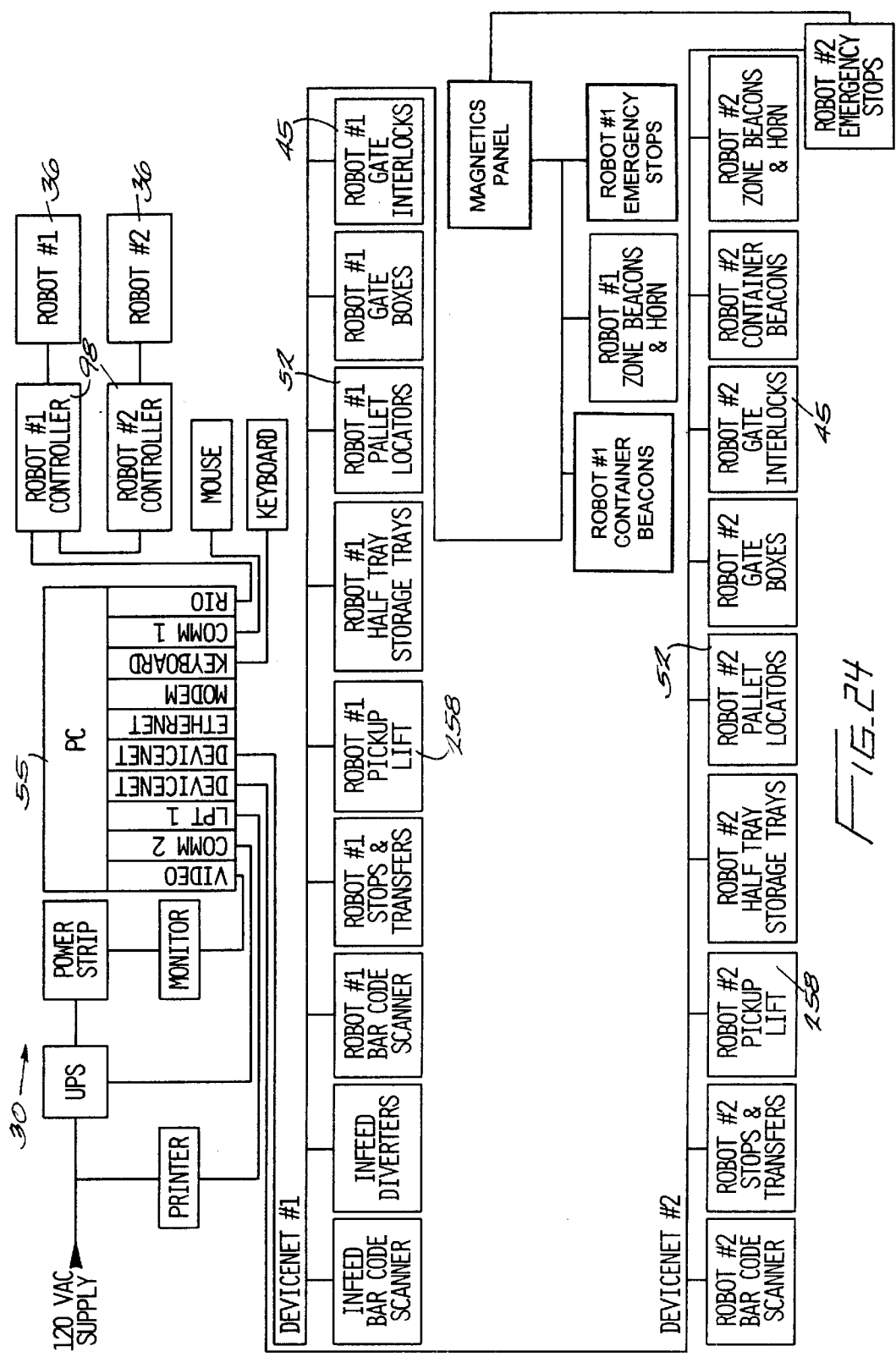
FIG. 24 is a schematic diagram illustrating the electrical interconnection of components in the system of the present invention.

A containerization and palletizing system 30 made in accordance with the teachings of the present invention is shown in FIGS. 1 through 3B. The system 30 includes two cells 32 and 34 each equipped with a gantry or overhead-type robot 36, although the invention may be implemented with just one cell and one robot as well as other types of robots. Each cell 32, 34 has a frame 38 which may be secured to a hard surface such as a concrete floor 40. The space between the frame members may be enclosed with a perimeter fence 42, a mesh, a similar material, or even other types of walls. One or more gates or doors 44 may be provided to permit access to the interior of the cell. Each cell 32, 34 has a plurality of places or bays 46 for pallets 49 and carts 50. Sensors (not shown) sense the presence or absence of pallets 48 and carts 50 (generically referred to as a "containers") in a bay and that information is communicated to a system controller 55 (described further below). Pallets and carts may be moved into and out of the cells 32 and 34 (by non-robotic means) through the access gates or doors 44. Gate interlocks 45 (FIG. 24) sense whether the doors 44 are open and lock the doors in place when they are closed. As discussed below, upon receipt of an appropriate command signal, the interlocks may be released to permit the doors 44 to be opened by technicians operating the system.

In the embodiment described herein, each cell 32/34 is divided into two zones $Z_1$ and $Z_2$ (FIGS. 3A and 3B) and each door 44 provides access to a zone. For the embodiment shown in FIG. 3A, the cell 32 is divided into zone $Z_1$ with Locations 119, 121, and 123 and zone $Z_2$ with Locations 113, 115, and 117. Cell 34 is divided into zone $Z_1$ with Locations 107, 109, and 111 and zone $Z_2$ with Locations 101, 103, and 105. The embodiment shown in FIG. 3B is similarly configured. Cell 32 of FIG. 3B has zones $Z_1$ and $Z_2$ and Locations 13–24. Cell 34 of FIG. 3B has zones $Z_1$ and $Z_2$ and Locations 1–12.

The division of cells as into Locations (also referred to as bays) provides an exact place or site for each bay and the container associated with that bay. These positions are used by the controller to instruct the robot where to move when putting a tray (as defined below) in a container.

Mail trays 60, tubs 61, flats 62, and similar cartons (which from time-to-time are referred to generically as "trays") are brought into the cells 32 and 34 along paths $P_A$ and $P_B$ by a conveyor system 66. In the embodiment shown, two parallel conveyors 68 and 69 are positioned to move items from one end of the cells to the other. As best seen by reference to FIGS. 3A, and 3B, within each cell is a conveyor 72 which runs in a direction such that packages may be moved in the circular paths $P_1$ and $P_2$. A plurality of sensors (not shown) is positioned along the conveyors in order to detect the location and presence of trays on the conveyors 68, 69, and 72. Information from the sensors is communicated to the system controller 55.

In the embodiment shown, the robot 36 in each cell 32, 34 is mounted on a plurality of beams 76 and 78 spanning the cell from side to side, perpendicular to the robot's long axis. The beams 76 and 78, in turn, are mounted on powered and guiding tracks 80 and 82, respectively, at the top of the cell, parallel to the long axis of the cell. The robot is movable along the beams 76 and 78 and the beams are movable on the tracks 80 and 82. The tracks 80 and 82 are positioned parallel to the floor under the cell. So mounted, each robot is movable along X and Y axes in a substantially horizontal plane.

Each robot 36 includes a vertically telescoping robot arm 90 (FIG. 4). At the end of the arm 90 is a turning disc or wrist 92. Mounted to the wrist 92 is an end effector or gripper 95 (more fully described below). Each robot 36 is controlled by its own robot control system 98 (FIGS. 1–3) which includes software that controls the movement of each robot within each cell. The robot control system 98 interfaces with the system controller 55 (that, as described above, controls the conveyors running through the cells and senses the presence or absence of carts and pallets). The system controller 55 sends commands to the robot depending on the status of the system 30. Of course, it should be understood that while two separate control systems 55 and 98 are described herein, a single control system (not shown) combining the functions of the robot and system controllers could be implemented.

One type of robot controller suitable for use in the present invention is an S4C robot controller available through ABB Flexible Automation, Inc. The S4C robot controller may be loaded with software (described more fully below) that is designed to carry out the desired operations of the controller. When an S4C robot controller is used, the system controller may be implemented using a server or even a personal computer. Like the robot controller, the system controller is loaded with software designed to carry out the desired operations of the system.

The gripper 95 mounted on each robot 36 is best seen by reference to FIGS. 4 and 6. The gripper includes a mounting plate or wrist adapter 100 designed to be coupled to the wrist 92 on the end of the robot arm 90. The wrist adapter 100 is coupled to a main body 105 of the gripper 95. The main body 105 supports the other components of the gripper. Among the active components are a plurality of fluid-actuated offset fingers 107, which in the embodiment shown consist of two pairs of two fingers 109 and 111. The first pair of fingers 109 is positioned on the left end of the gripper 95 and coupled to a fixed plate 113. The second pair of fingers 111 is positioned on the right side of the gripper and mounted to a movable plate or carriage 115 that is movable between a first, open position and a second, closed position (see, for example, FIGS. 13A and 13B).

The carriage is coupled to track 117 by a plurality of slides 119 and moved by an actuator 121 (such as a rodless cylinder, but preferably a multiple-pressure clamp cylinder) coupled to the main body 105. The clamp force of the actuator 121 may be controlled using a valve 122, such as an open/closed air control valve, and a proximity switch 124, such as an intermediate-open proximity switch. As best seen by reference to FIGS. 13A–16B, the movement of the second pair of fingers 109 allows the gripper to pinch and release a variety of loads between the pairs of fingers 109 and 111.

Each finger 107 has a curved or offset form with a first straight portion 130 (FIG. 4), a second straight portion 132, and a bent tip 134, aligned at an angle of about 80° with respect to the second straight portion 132. Each finger sits in a bearing 140 within the fixed plate or the movable plate, as the case may be, and is coupled to a drive plate 150 through drive linkages 152 (FIGS. 5A–5B). The drive plate 150 is coupled to a piston rod 154 from a linear actuator 156 such as a fluid actuator. The actuator 156 has a first end 158 pivotally mounted to the fixed or movable plate, as the case may be. As the piston rod 154 moves between its extended and retracted positions, the actuator 156 pivots to accommodate the lateral motion of the drive plate 150. The drive plate 150 is sized and shaped such that the bent tips on each finger may be rotated through about 90° between a first open position Op and a second closed position Cp, where the bent tips are positioned beneath the load to be carried by the gripper.

Referring again to FIGS. 4 and 6, mounted in relatively close proximity to the fingers is a mail measurement and containment plate 160, which is used to detect and measure the height of trays and tubs placed in carts and on pallets. The measurement and containment plate 160 is shaped like an H with two long arms 162 and 164 coupled to one another by a first central cross member 165 and a second, notched cross member 166 which is positioned adjacent to the first pair of fingers mounted on the fixed plate, although the plate can have other shapes and forms and provide similar functionality. The measurement and containment plate 160 is gravity driven, supported by two pairs of linear rods or bearings 170 and 172 which are mounted in their own bearings 174 and 176. Each pair of bearings 174, 176 is supported by a support bar 180 coupled to the main body 105 of the gripper. The measurement and containment plate 160 is sized and positioned such that it rides atop of any load grasped by the fingers 107.

As noted previously, the gripper 95 is designed to carry out top loading of carts and pallets. Thus, as the gripper grasps an article of interest or load, the measurement and containment plate 160 contacts the top of the load and moves vertically along the linear rods 170 and 172 until the gripper has surrounded the load sufficiently to permit the bent tips 134 of the fingers 107 to move under the load (see FIGS. 5A–5B). Movement of the plate 160 is used to measure the height of the load. Initially, the plate is in a raised position when a tray or tub is located in the gripper. The robot then moves to a known height drop-off destination inside a mail cart or at a pallet. The gripper then releases the tray or tub, which will settle on or nest in the tray or tub, if any, below it. The robot 36 executes a vertical move upward and starts a measurement process while the gravity containment plate stays in place on top of the mail in the delivered tray or tub. One or more proximity sensors (not shown) sense a switch target when the end of the vertical plate travel has been reached. The current vertical position of the robot's wrist is recorded and stored in memory. The final delivered height of the tray or tub is now known and the next layer to be delivered is adjusted by the robot program to accommodate the previous height or position of the delivered mail tray or tub. The measurement and containment plate 160 also helps to prevent loose mail in unsleeved trays or tubs from falling out of the trays or tubs during robotic transportation. The downward force exerted on the top of the mail tray/tub also helps maintain the grip of the fingers.

In order to load carts having shelves, the gripper 95 may also include a shelf-lowering assembly 200. As best seen by reference to FIGS. 7, 8, and 9, the shelf-lowering assembly 200 includes a support plate 202 which is coupled to a linear actuator 204 mounted on the main body 105 of the gripper 95. The linear actuator 204 may include a drive or piston rod 206 and one or more guide or load bearing rods 208, but many variations could be used and would be apparent to those of ordinary skill in the art. The linear actuator 204 drives the support plate 202 between a first retracted position Rp and a second, extended position Ep, shown in phantom (FIG. 7). The support plate 202 has a finger pivot bracket 210 with a pivot pin 212. In addition, the support plate 202 has provisions for accommodating an upper spring attachment point 216. A finger 218 is coupled to the pivot pin 212 and positioned within the pivot bracket 210. The finger 218 has a first gripping end 220, a pivot point 222, and a second end with a cleavis or similar type pin 224. One or more elastic members 226 such as extension springs are mounted between the upper spring attachment point 216 and the cleavis pin 224 on the finger 218. The support plate 202 also has provisions, such as a leg 230, on which a push plate assembly 235, including an actuator 236 and a shelf-latch push plate 238, is mounted. The actuator 236 may be a spring plunger or similar actuator.

Figure 11A:
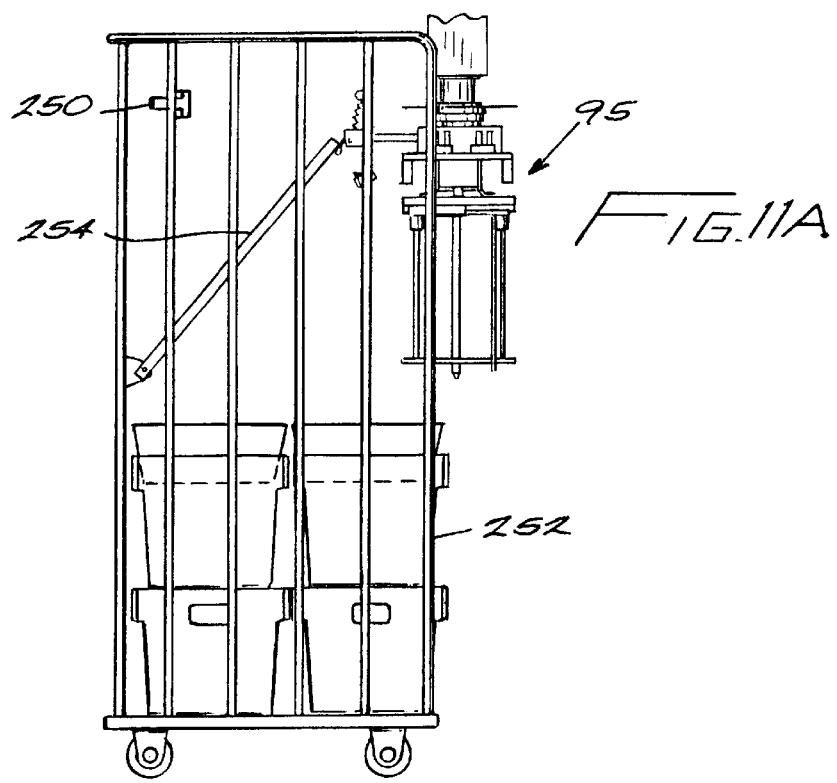
FIG. 11A is a side view of the gripper of the present invention lowering a shelf on a mail cart.
Figure 11B:
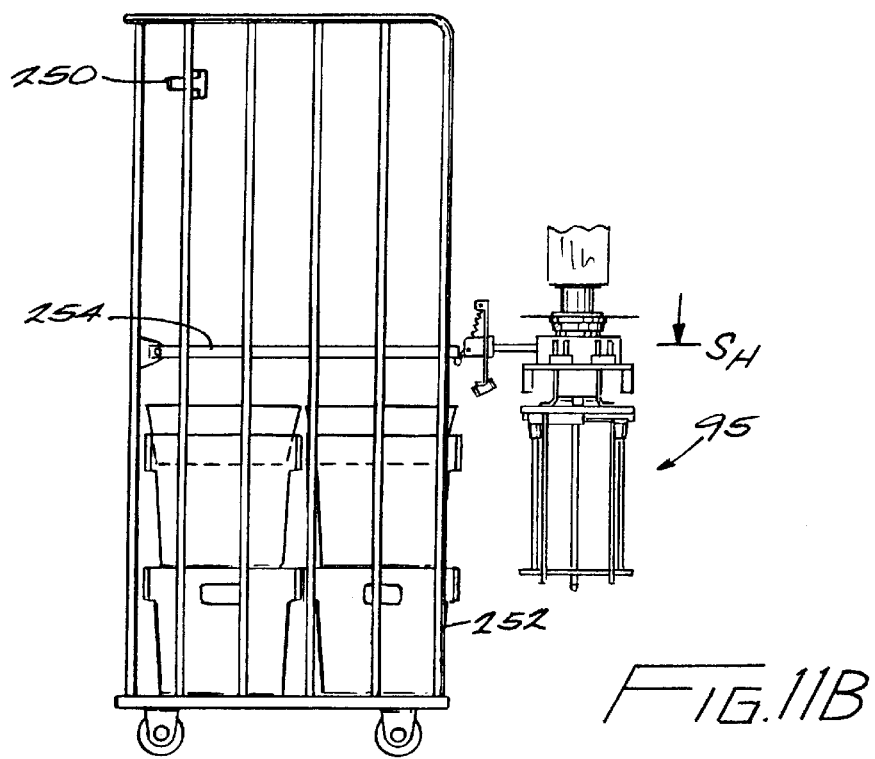
FIG. 11B is a side view of the gripper of the present invention as shown in FIG. 11A illustrating the shelf at a horizontal position.

As best seen by reference to FIGS. 10A–10C, to release a shelf latch 250 on a cart 252, the robot 36 executes a series of programmed moves to engage and release the cart's shelf latch 250 by engaging the push plate assembly 235 with the latch 250. As shown in FIG. 10A, the cart 252 includes a shelf 254 which is located in a vertical position $S_V$ so that the lower half of the cart 252 may be loaded. Once the lower half is full, the robot 36 moves the gripper 95 to a position adjacent to the shelf 254. The finger 218 (FIG. 10B) contacts the shelf 254. Once the finger 218 contacts the shelf 254, the push plate 238 is driven into contact with the latch 250 by the actuator 236. The push plate 238 is driven sufficiently far to release the shelf 254 from the latch 250. As best seen by reference to FIGS. 11A and 11B, when the latch is released, the lowering process begins and the robot moves the shelf 254 to a horizontal position $S_H$. A shelf-present sensor 256, such as a photoelectric sensor, is used to sense the location or presence of the shelf 254 during the shelf-lowering process. Once the shelf 254 is lowered, loading of the top half of the cart begins, using the same or similar method that was used to load the bottom half of the cart.

In operation, mail trays, tubs, and other items are placed on the conveyors 68 and 69. The conveyors bring the items into the cells. Once inside the cells, the items are directed to the central conveyor 72 to a desired location or pick-up point. The presence of an item at the pick-up point is sensed by a sensor and the sensor sends an item or part present signal to the system controller, which in response to receiving that signal turns off the conveyor. The mail tray or tub is then lifted vertically from the conveyor surface by a pick-up lift 258 (shown schematically in FIG. 24) allowing the robot's gripper fingers to engage the item. The system controller also informs the robot that an item is located at the pick-up point. The robot then moves to the item, grasps it, and moves it to a cart or pallet within the cell.

Figure 12B:
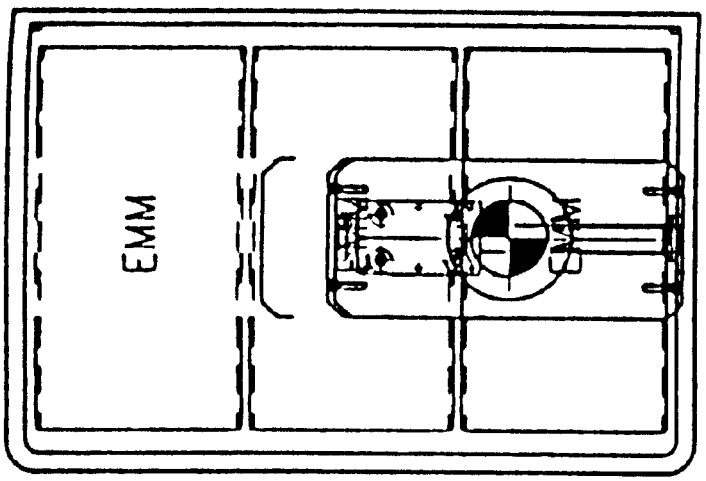
FIGS. 12A–O are schematic diagrams illustrating the various methods of stacking different types of mail trays and tubs implemented with the present invention.
Figure 12A:
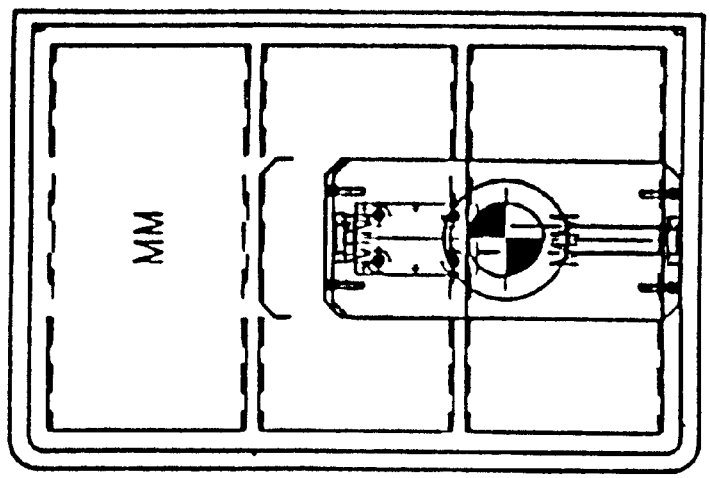
Figure 12D:
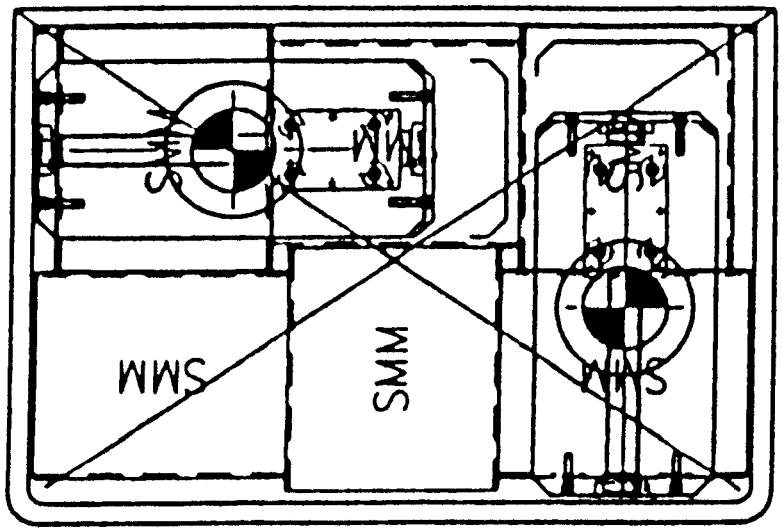
Figure 12C:
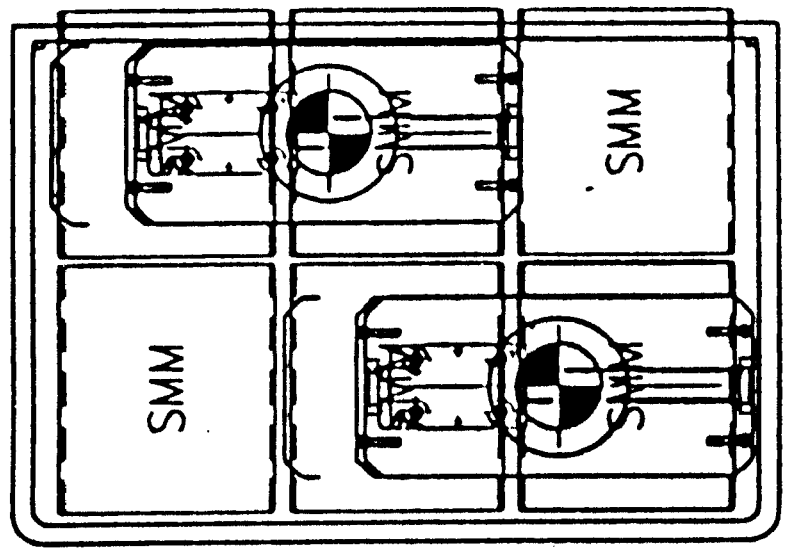
Figure 12F:
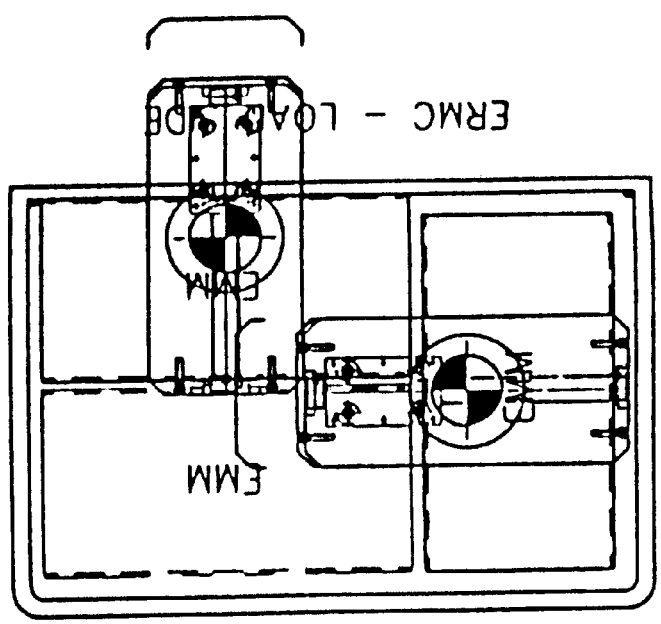
Figure 12E:
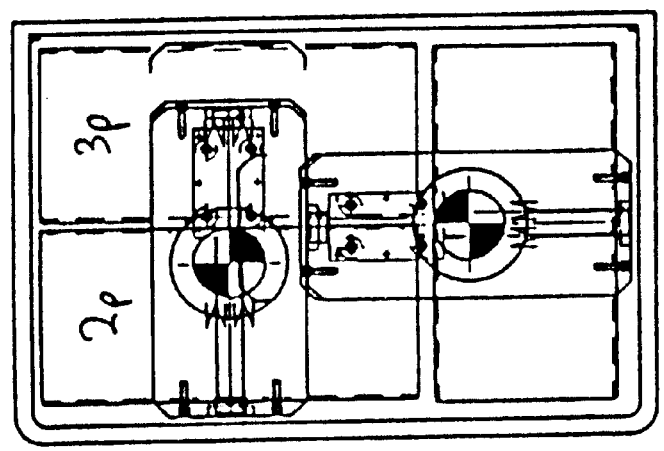
Figure 12H:
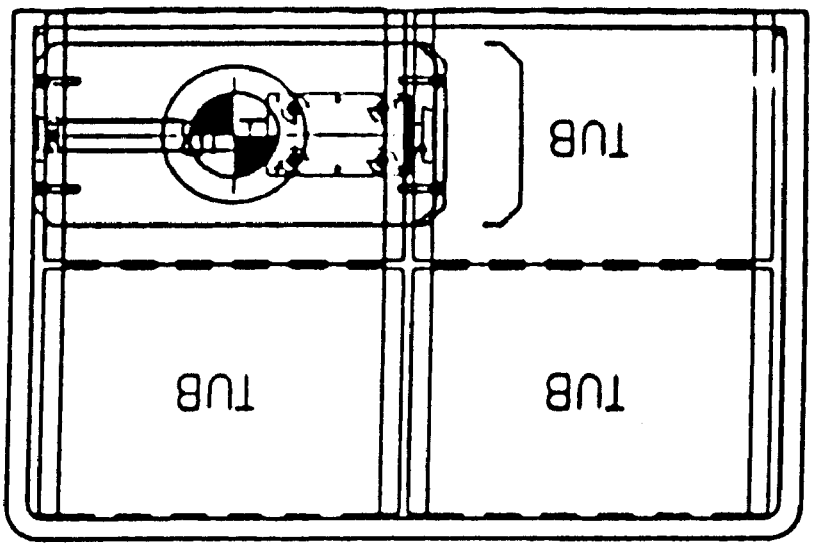
Figure 12G:
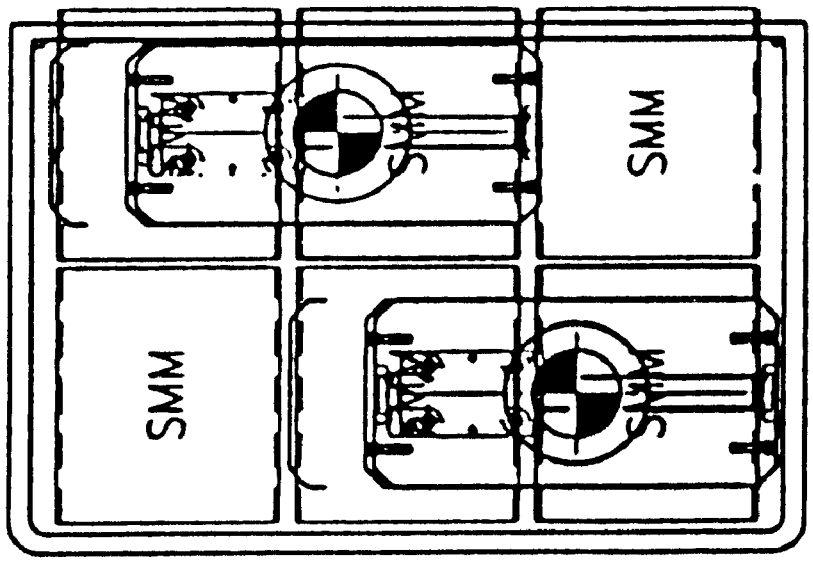
Figure 12J:
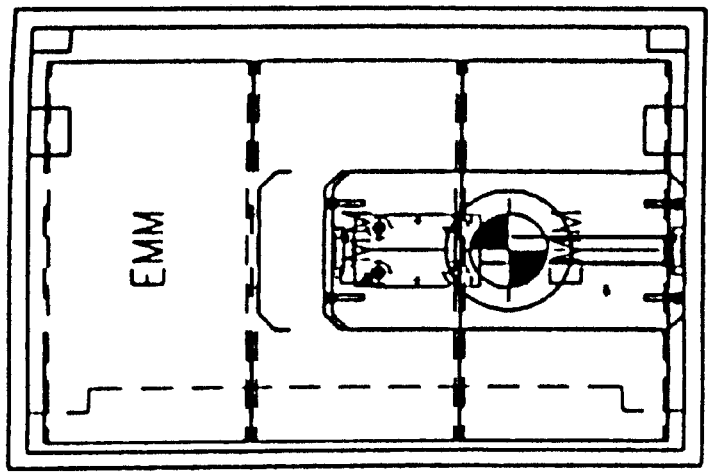
Figure 12I:
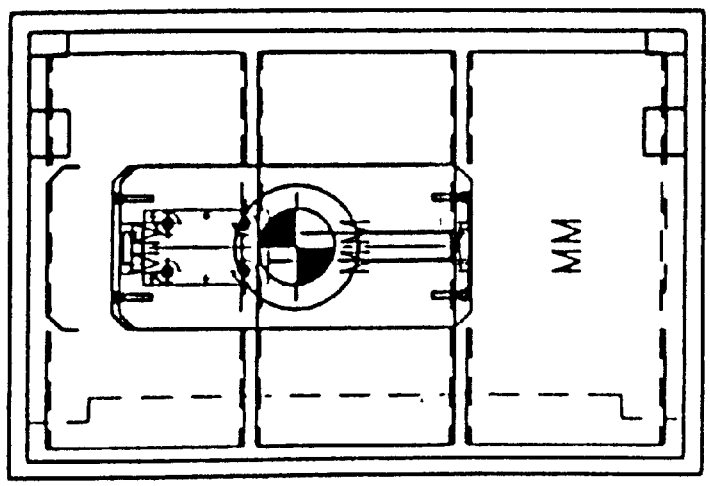
Figure 12M:
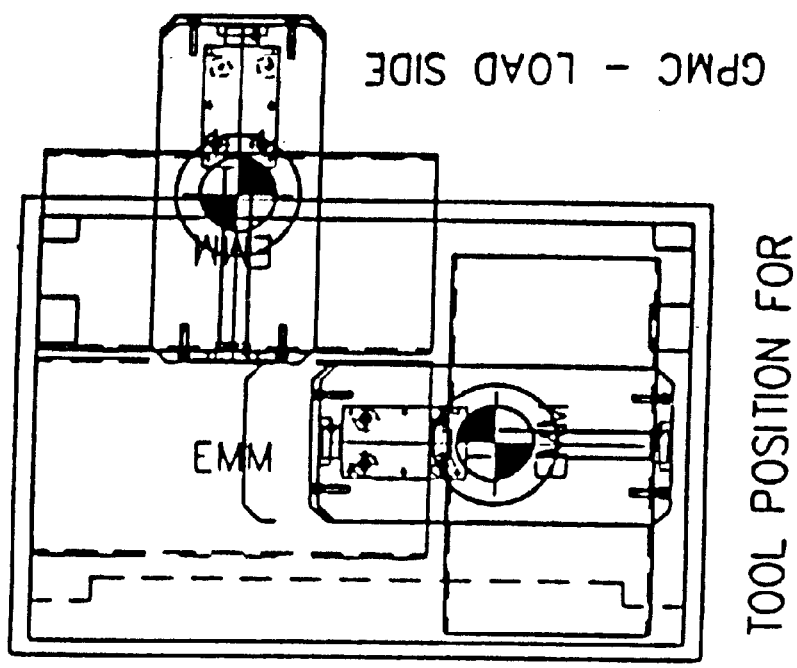
Figure 12L:
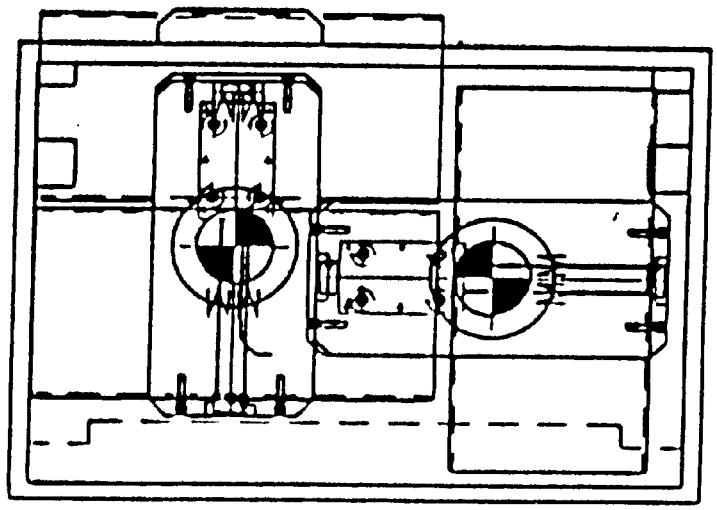

The manner in which the present invention loads items on carts or pallets depends on the type of tray or tub being handled and the type of cart or pallet being loaded. The handling and stacking of various trays and tubs into various carts is shown in FIGS. 12A–O. The trays are positioned at various positions such as positions 1p, 2p, 3p, in FIG. 12E. For brickstacking, layers of trays are alternated to enhance the stability of the stack. For those instances where the cart has a shelf, the present invention uses the shelf-lowering assembly 200 as described above.

The present invention can be implemented in a variety of embodiments. One alternative embodiment is shown in FIG. 17. That embodiment includes a gripper 265 which is similar to the gripper 95 except it has been modified to have a total of eight off-set fingers 270 grouped in a first set 271 of four fingers and a second set 272 of four fingers. FIG. 18 shows another embodiment of the invention, a gripper 280. The gripper 280 is similar to the gripper 95 except that it includes four straight fingers 282 with tips bent at 90°. FIG. 19 shows yet another embodiment of the invention, a gripper 290 having a shelf lowering mechanism 292 which uses a shelf spring 294 in place of a biased finger as was used in the gripper 95. The various embodiments shown in the drawings, including FIGS. 17, 18, and 19, may be combined in a multitude of ways to create various embodiments of the end effectors described and illustrated. For example, an end effector suitable for use in the invention might include only 2 or 3 fingers, although the inventors believe that performance is enhanced when four or more fingers are used. Further, although the end effectors are shown as having one set of fingers mounted to a fixed plate and another mounted to a movable carriage, both sets of fingers could be mounted on carriages or similar movable mechanisms. Other possible combinations of the features described herein would be readily apparent to those of ordinary skill in the art and are not discussed.

As should be understood, the robot must understand how to handle a variety of tubs and trays and carts and pallets. The architecture of the software used to control the robot is illustrated in FIGS. 20A–23D. Preferably, the software is written in the RAPID language and it is assumed that the reader is familiar with that language. Reference material on the RAPID language is available from ABB Flexible Automation, Inc.

As can be seen by reference to FIGS. 20A and 20B, the software run on the robot controllers 98 begins with a main module 400. The main module 400 executes a housekeeping routine at 402 and then selects a motion set at 404. The set of actions or motions available to the robot consists of eight general choices 410, 415, 420, 425, 430, 435, 440, and 445. Before explaining any of the choices, the housekeeping routine will be discussed.

Figure 21A:
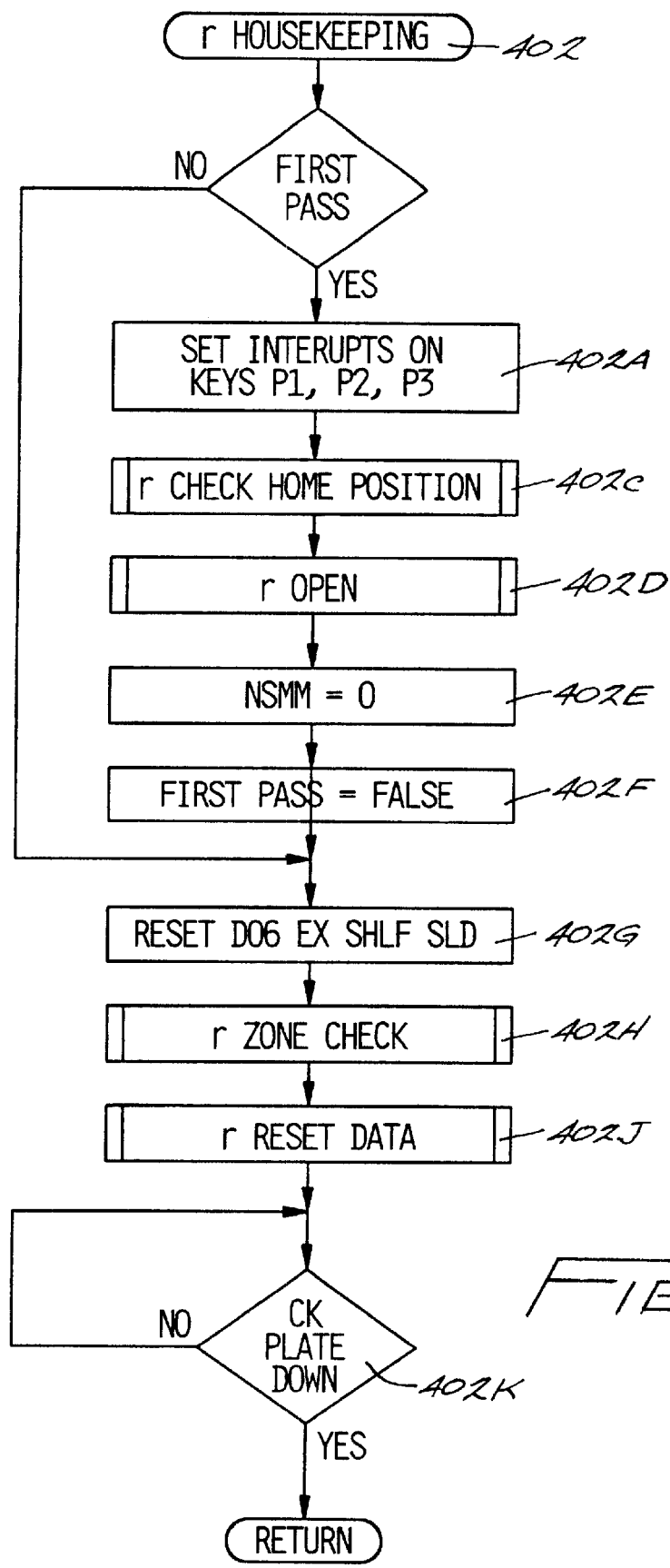
FIG. 21A is a flow chart illustrating the housekeeping routine of the main program.
Figure 21C:
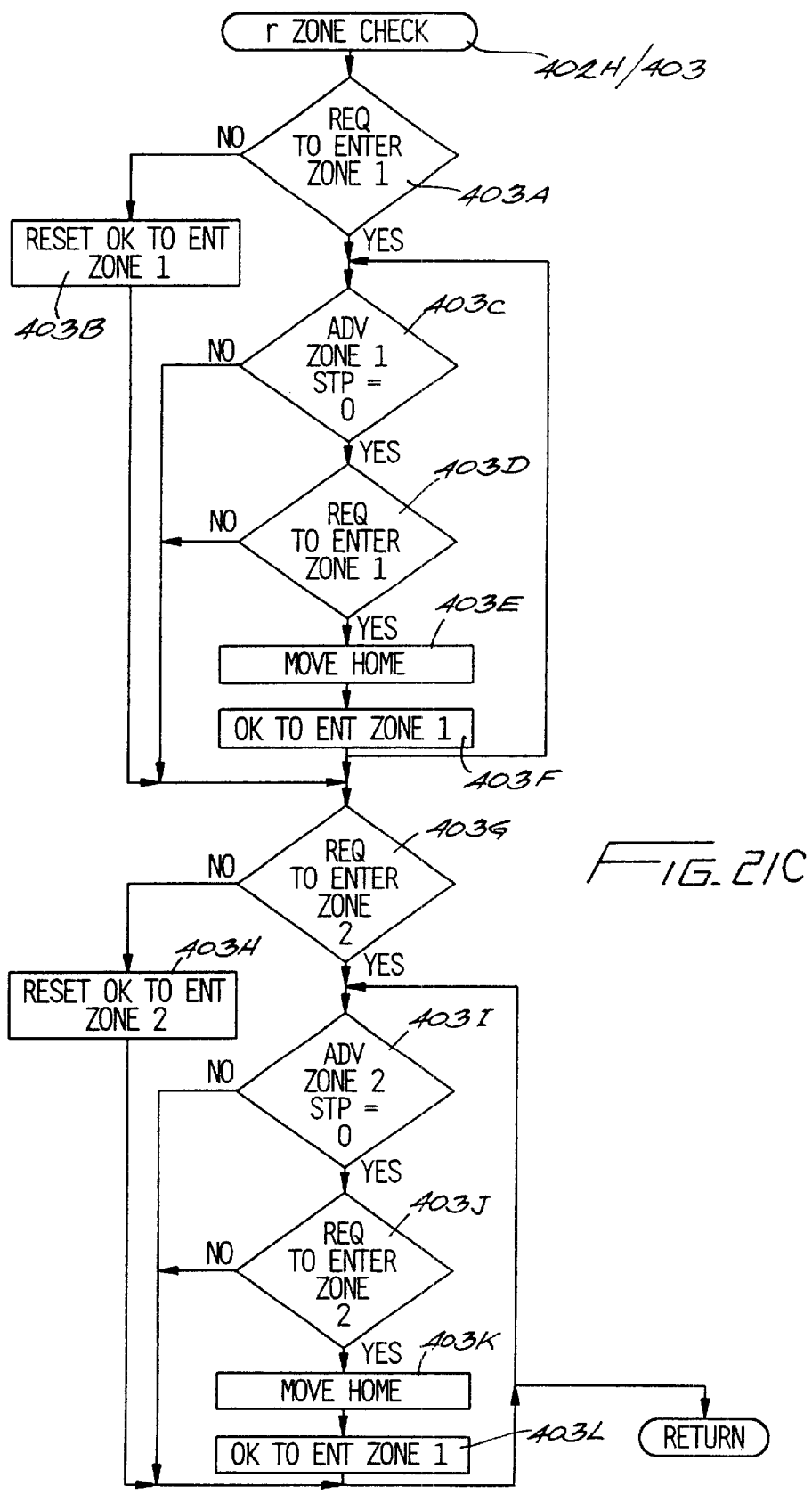
FIG. 21C is a flow chart illustrating the zone check routine of the main program.
Figure 21D:
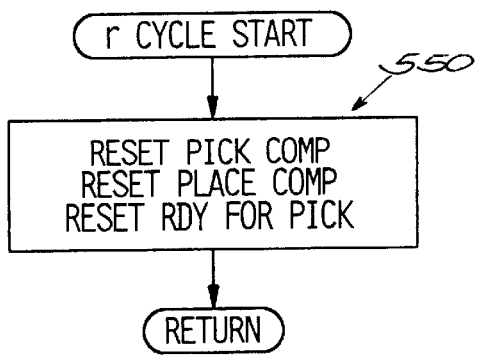
FIG. 21D is a flow chart illustrating the cycle start routine of the main program.
Figure 21G:
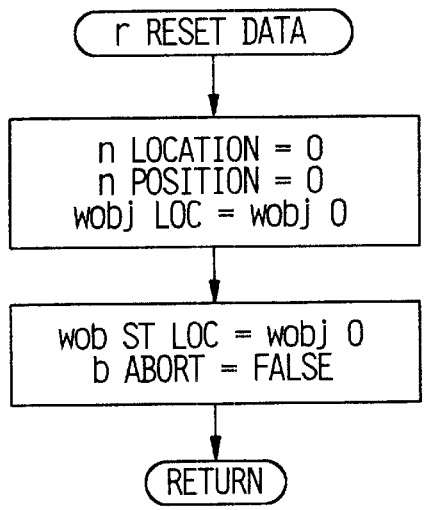
FIG. 21G is a flow chart illustrating a data reset routine of the main program.
Figure 21E:
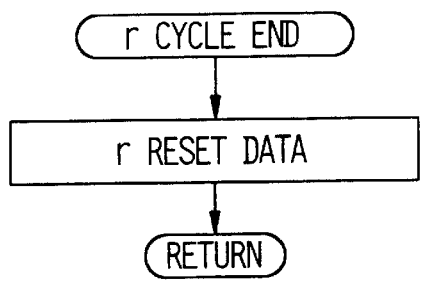
FIG. 21E is a flow chart illustrating the cycle end routine of the main program.
Figure 21H:
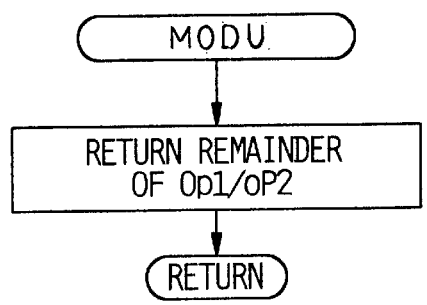
FIG. 21H is a flow chart illustrating a remainder routine.
Figure 21F:
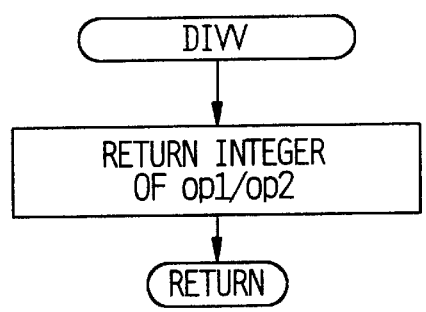
FIG. 21F is a flow chart illustrating a division routine.
Figure 21I:
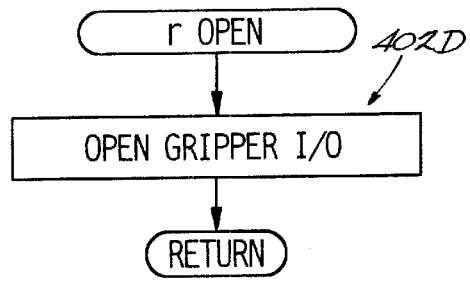
FIG. 21I is a flow chart illustrating a gripper I/O routine.

FIG. 21A illustrates the housekeeping routine 402. This routine cleans up I/O data and returns the robot to the start state. When the robot conducts a first pass or first pick and stack operation, such as might occur on initial start up of the system, the housekeeping routine sets interrupts at 402A. The housekeeping routine then calls the check home position routine at 402C. The check home position routine verifies the home or starting location of the robot. An open routine at 402 D is called next, and this routine (as seen in FIG. 21I) opens the end effector or gripper 95. The housekeeping routine sets the short managed mail ("SMM") object to zero at 402E. The object is so set to indicate that this is the first pass and that the robot has not yet handled SMM trays. The routine then sets the first pass object to false, at 402F, so that the basic initializations and checks discussed above are not carried out in subsequent passes. As illustrated in steps 402G–402K, for every pass, the system ensures that the shelf lowering mechanism is retracted and out of the way, resets the system data, conducts a zone check, and checks the robot to ensure that the containment plate is in a down position.

The zone check conducted by the system prevents movement of the robot(s) 36 when an access door 44 is open. This prevents potential injurious contact between technicians in a cell 32/34 and the robot. As noted, each cell 32, 34 is divided into zones and the doors 44 provide egress in and out of the cells. When the system is operating and a need arises to enter a zone (such as to retrieve a full container), the operating technician inputs a request to enter a zone. The system controller relays the request to the robot controller. The zone check routine 403 (FIG. 21C) handles such requests.

The system first checks to see if a request was made to enter zone $Z_1$, at 403A. If no request is made, the system resets itself at 403B so that an entry into zone $Z_1$ is not permitted. If a request is made, the system checks the zone stop at 403C, checks that the request to enter zone $Z_1$ is still active at 403D, instructs the robot to move to its home position at 403E, and sends a message to the system controller at 403F that entry may be made.

The system then checks for a request to enter zone $Z_2$ at 403G. If no request is made, the system resets itself at 403H so that entry into zone $Z_2$ is not permitted. If a request is made, the system checks the zone stop at 403I, checks that the request is still active at 403J, instructs the robot 36 to move to its home position at 403K, and sends a message to the system controller 55 at 403L that entry may be made.

FIG. 21B illustrates the motion set select routine 404. This routine determines which action the robot needs to perform next based on input from the system controller 55. The routine 404 sets the motion set value to zero at 500, checks to see whether there has been a request for services at 502. If so, the motion set is set to 91 at 504. If no service request is received or once the service request is complete, the routine checks for user input from the man-machine interface (not shown) at 506.

If there is input from the user, the user menu variable is set to false at 508 and then the motion set is set to "92" at 510. The motion set 92 may be used for presenting a user menu. Although, the present invention has not yet be developed to include a functional user menu. Accordingly, motion set 92 is merely a placeholder for the software illustrated and described herein.

Whether there is user input or not, the routine then checks at 512 whether the robot is handling an SMM tray. If so, the SMM tray is stored until two are available to stack together as a unit and the motion set is set to 1 (which corresponds to choice 410), at 514. The routine then checks at 516 whether a tray is present for pick up at a storage stand or a tray is present on the pick up point on the conveyor. If the tray is to be placed in a container, the corresponding motion set is established at 520. Block 521 represents the logic for the motion sets 3 through 8, which correspond to the choices 420, 425, 430, 435, and 440, respectively. Five checks (not shown) are made to determine the appropriate motion set for the type of tray and container involved in the pick and placement to be accomplished. At 522, the routine checks the status of the motion set to ensure it has been determined at 520 or 521. If the motion set is still zero, the robot waits for a command from the system controller 55. If the motion set is not zero, or the waiting period 526 has expired, the processor then returns to the main program to execute the chosen operation.

Depending on the value of the motion set as determined above, one of the choices 415, 420, 425, 430, 435, or 440 will be carried out. Each of these choices is very similar in nature except for the type of tray, i.e., MM (managed mail), SMM (short managed mail), EMM (extended managed mail), or tub being handled and the type of container, i.e., cart or pallet in which the tray is placed. Therefore, for the sake of brevity, only two specific instances will be described in detail: motion set 2 and motion set 3. Further, it should be noted that with the flow charts provided, one of ordinary skill in the art could readily determine the operation of the software.

Figure 22A:
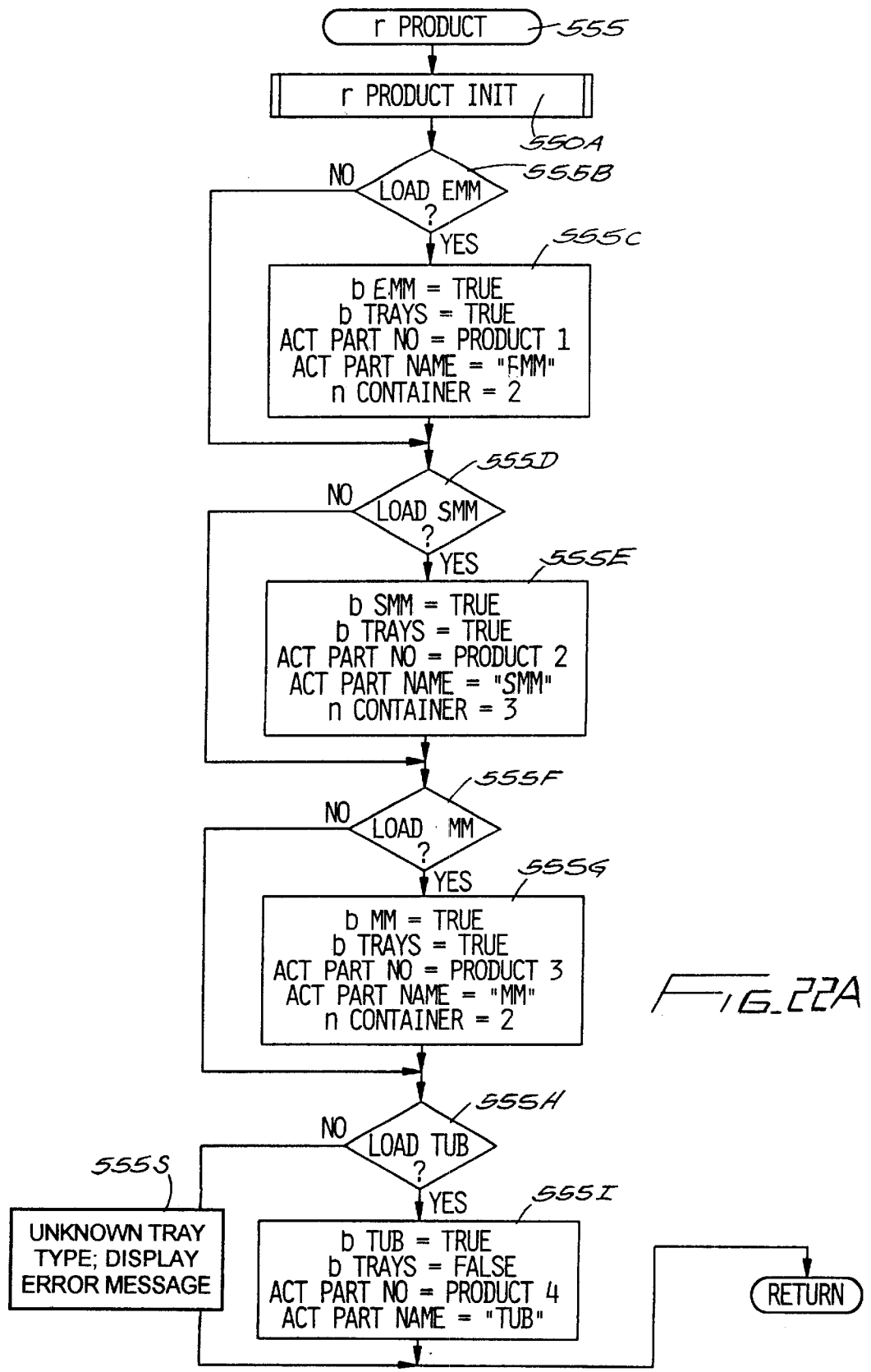
FIGS. 22A and B are flow charts illustrating the product identification routines of the main program.
Figure 22B:
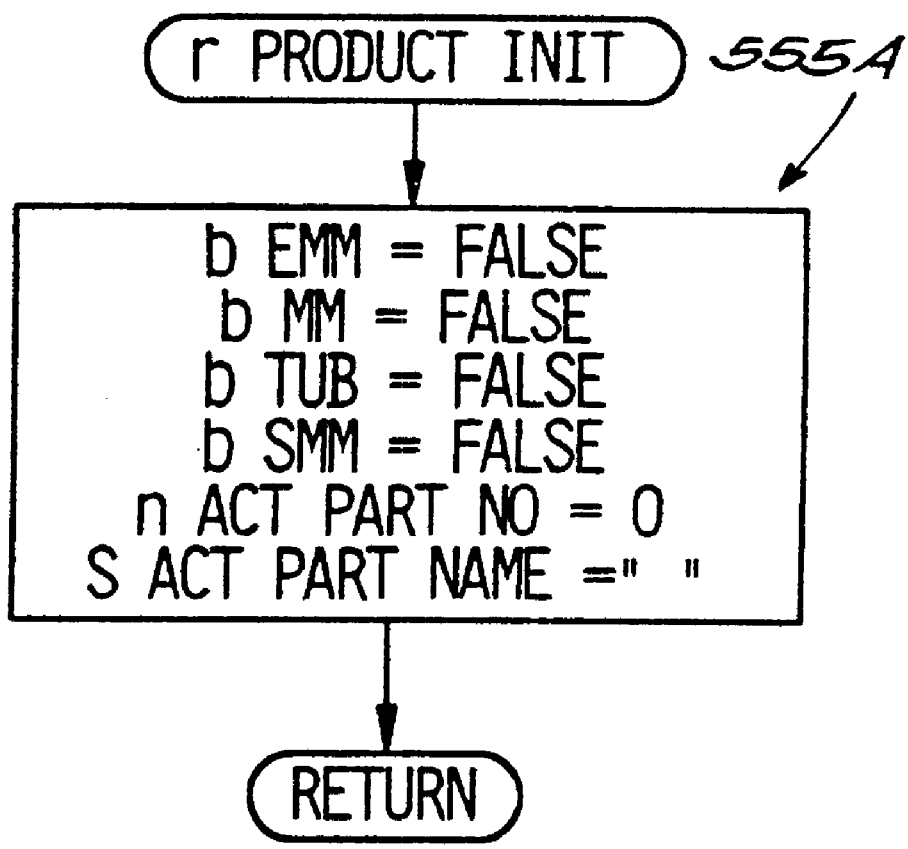
FIGS. 22C, D, and E are flow charts illustrating the location routine of the main program.

The first instance that will be described is choice 415. In choice 415, it is assumed that a tray will be picked from the conveyer system 66 (particularly conveyor 72) and placed in a general purpose mail cart (GPMC). The movement of the tray to the GPMC begins with the cycle start routine 550. As seen in FIG. 21D, the cycle start routine 550 resets the pick and place computations and then resets the system so that it is ready to pick up a tray. With reference again to FIGS. 20A and 20B, the product initialization routine 555 is then executed and the product or tray type is reviewed. As seen in FIGS. 22A and 22B the product type, part number, and name are initialized at 550A. The system then reads in the tray type and checks it at 555B. If the tray is an EMM tray, the system sets the appropriate objects to match an EMM tray at 555C. If the tray is not an EMM tray, the system checks to see if the tray is an SMM tray at 555D. If the tray is an SMM tray, the appropriate objects are set at 555E. If the tray is not an SMM tray, the system then checks to see if the tray is an MM tray at 555F. If the tray is an MM tray, the appropriate objects are set at 555G. The process of checking for type and setting objects for a tub are conducted in steps 555H and 555I. If the tray does not match any of the known types then an error message may be sent to the system controller 55, as shown at step 555J.

Figure 22C:
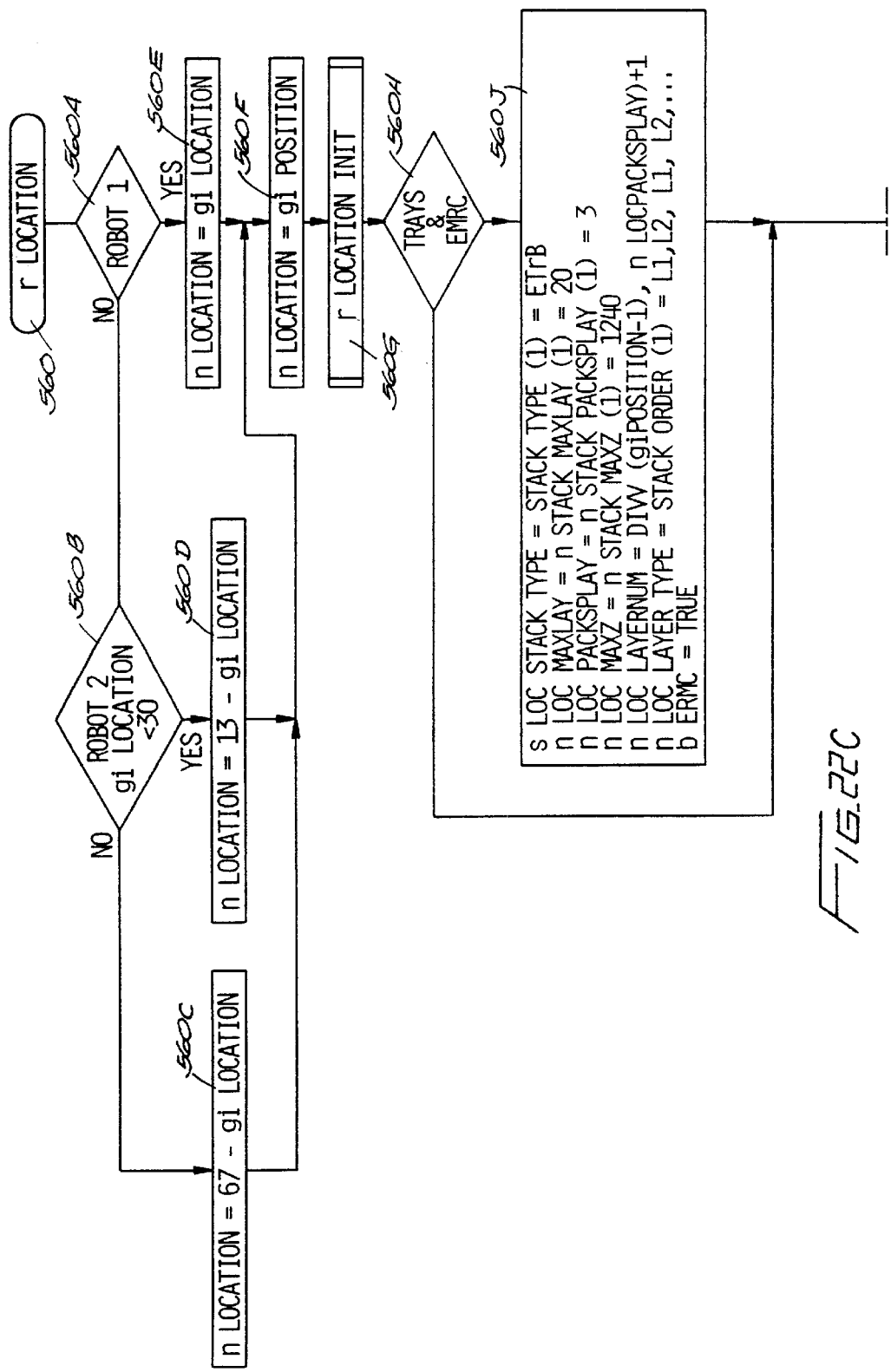
Figure 22D:
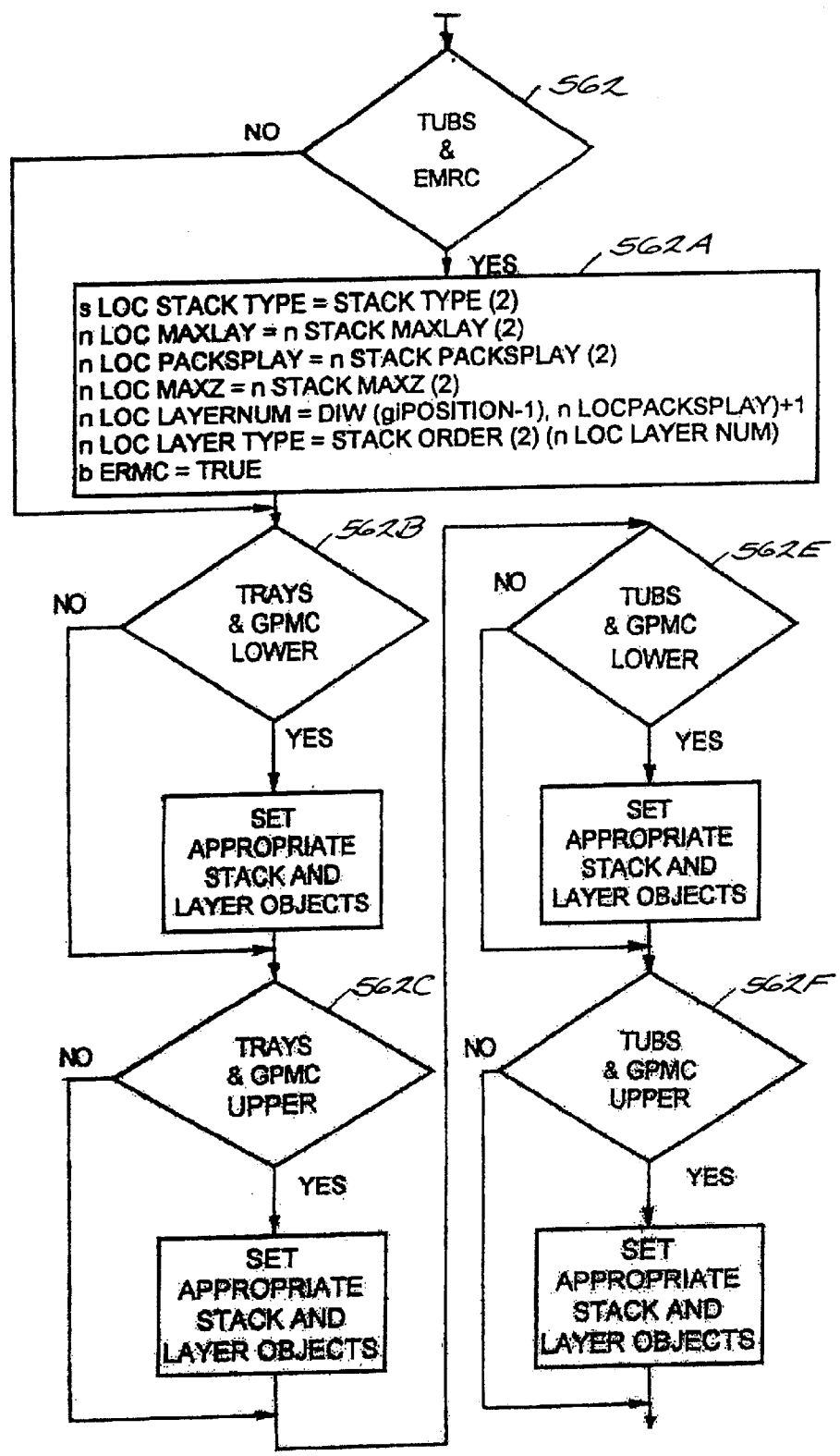
Figure 22E:
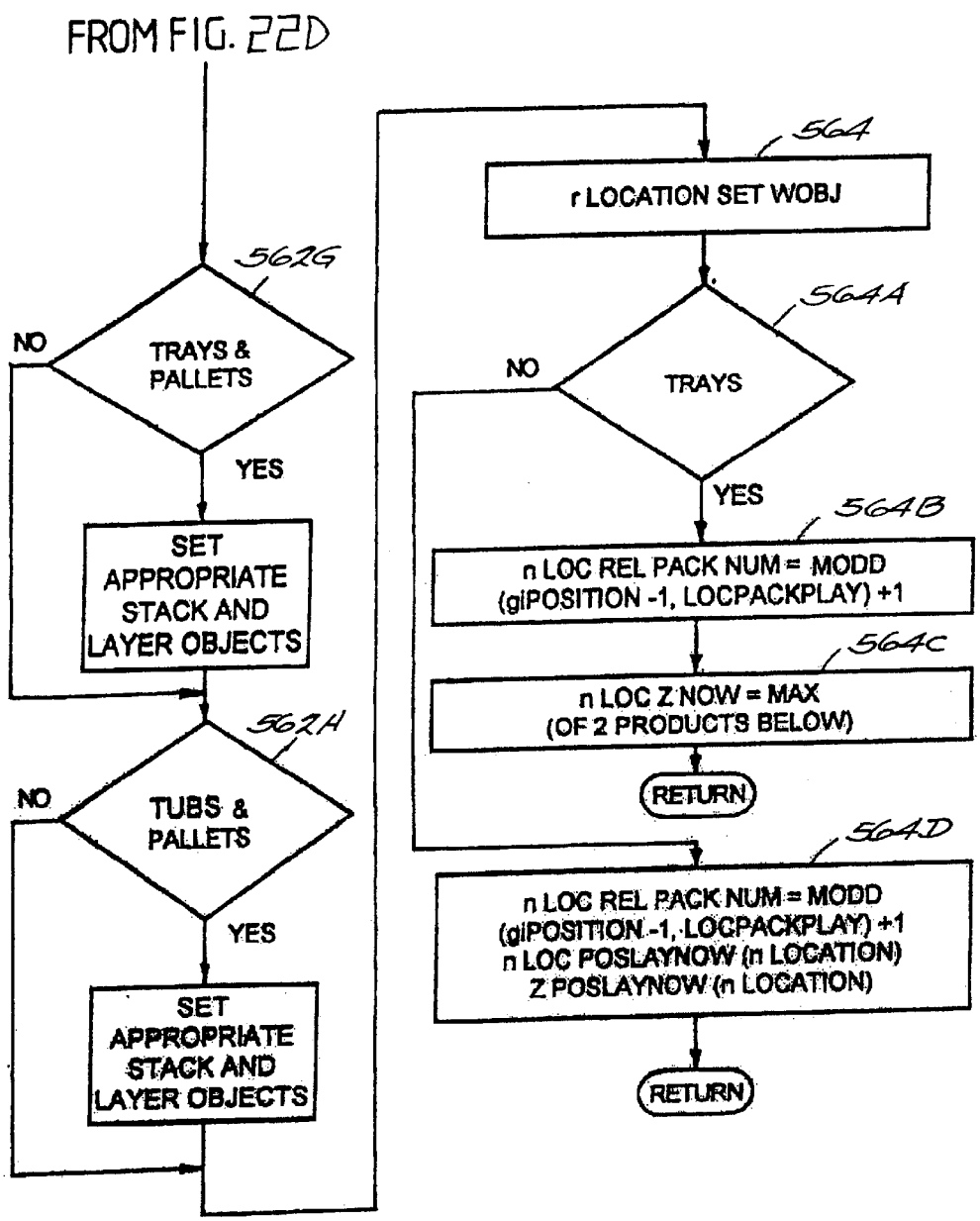
Figure 23A:
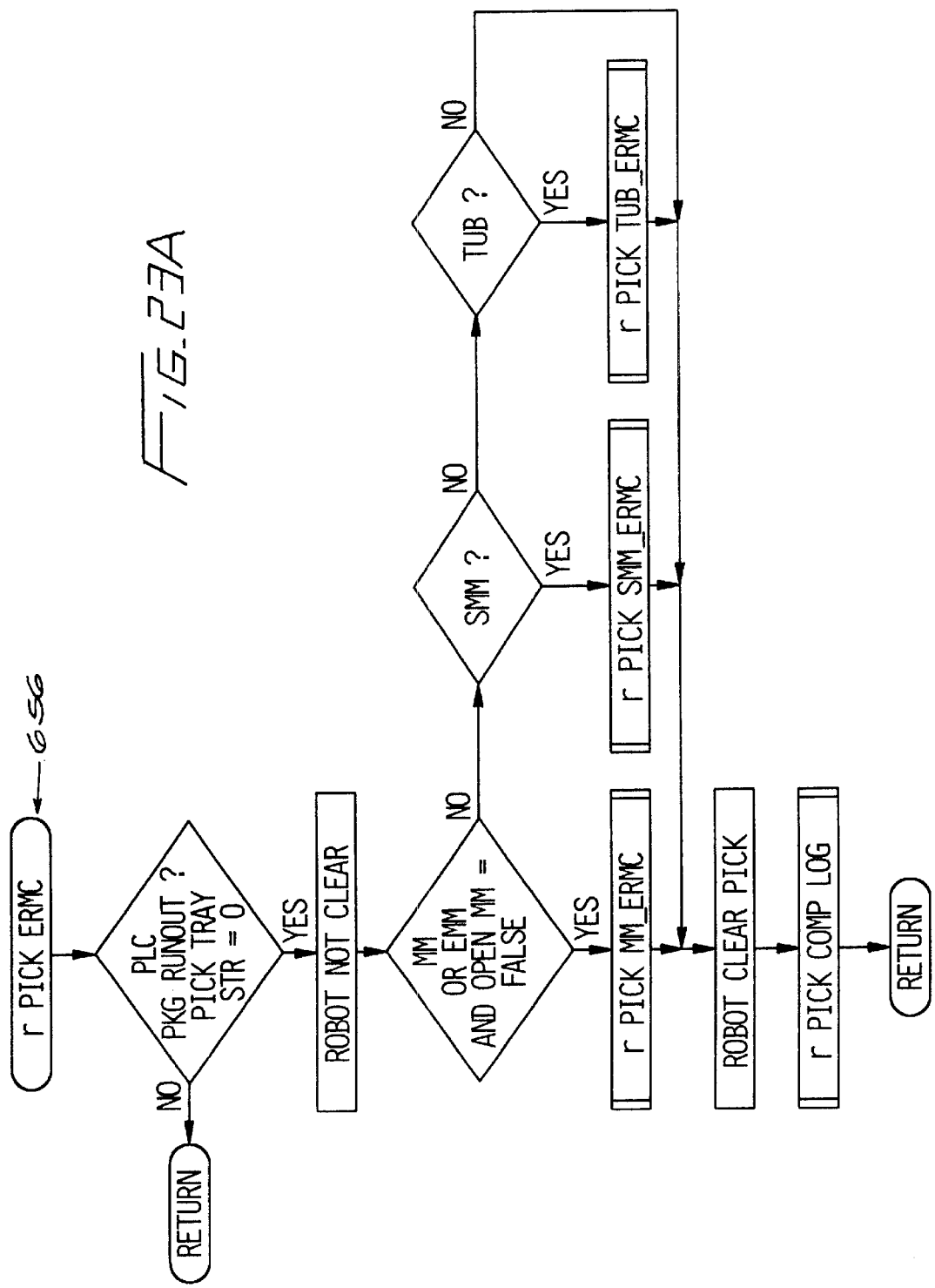
FIG. 23A is a flow chart illustrating the routine for placing an item in a first type of cart.

Once the system has determined the type of tray being handled, the system then executes a location routine 560. The location routine 560 determines the location where the tray will be placed (FIG. 22C). The location routine 560 checks the location command given by the system controller 55 (PLC). The command 36 provides information to the robot 36 concerning the bay to which the tray is to be moved.

It also contains information as to the position (for example, 1p, 2p, 3p) of the tray in the stack of trays on the cart or pallet, as the case may be.

In the preferred embodiment two robots are used and, in this embodiment, the system checks to see which robot is active at 560A and 560B. If the first robot is active, the location corresponds to the command received from the system controller 55. If the second robot is active, the location must be adjusted by an offset value in order to determine the true location in the two-cell system. In this way, the commands may be designed such that the locations are initially defined for just one cell, with the locations in subsequent cells corresponding to the first cell, but offset by a predetermined value. At 560D, the location is adjusted to account for an offset, which in the embodiment shown corresponds to the twelve bays in each cell (so the offset is 13 to start with bay 1 in the second cell). In the preferred embodiment, locations greater than a predetermined number (for example, 30) correspond to pallet locations. If the command from the system controller 55 includes a pallet location, an appropriate adjustment is made at 560C.

Once all offsets, if any, have been accounted for, the location is fixed at 560F. The system may then check whether any of the doors 44 are opened in a zone or area in which the robot needs to place a tray. If such a condition exists, the cycle ends and the robot is prevented from moving into a zone having an open door. This helps ensure that the robot 36 does not move while an operator or technician is present within the cell.

Once the check is complete, the system initializes the location using a location initialization routine 560G. The system then checks at 560H the type of tray and container to be loaded. If the tray is an MM, SMM, or EMM tray and the container is an ERMC, the appropriate stack and layer objects are set at 560J. The system then checks the tray and container type at 562. If the tray is a tub and the container is an ERMC, then the appropriate stack and layer objects are set at 562A. Additional checking and setting is accomplished in steps 562B–562H for various types of trays and containers. The system then sets the location at 564 through a call of the work object routine. Once the location is set, the system then determines at 564A the appropriate stacking routine to implement according to whether a tray or tub is being stacked. If a tray is being handled, a layer stacking routine is implemented according to steps 564B and 564C. If tubs are being stacked, a tub stacking routine is implemented according to step 564D.

Once the location routine 560 is complete, the system executes a pick routine at 570. The pick routine 570 checks at 570A whether the system controller 55 (PLC) should skip this procedure if a purge of a tray at a storage stand is requested. At 570B, the robot sends an instruction to the system controller that the robot is no longer clear of the pick up point so that no additional lifting of packages will occur. The system then determines at 570C, 570D, and 570E, the type of tray picked. If the type of tray is invalid, an error message is generated at 570F. If a valid tray is picked, the appropriate pick routine 572, 572A, or 572C is selected and executed. Once the pick routine is executed, the system indicates that the robot is clear of the pick up point at 572D and logs an entry at 572 indicating that the pick up operation is complete.

Once the pick up operation is complete, the robot moves to the proper location according to the move to location routine 580. The system determines whether the tray is to be loaded on a container or pallet and then moves the robot 36 from the pick up point to what is known as a "pounce position." The pounce position is a point over the cart or pallet at the known location. For locations 1–6 the system checks to see if movement into the corresponding zone is appropriate, at 580A$_C$. If movement is permissible (i.e., the appropriate door 44 is closed), the grasped tray is moved to the appropriate pounce position 580B$_C$ through 580E$_C$. Similar checking is carried out for locations 7–12, in steps 582A$_C$ through 582E$_C$. Locations 34–36 and 31–33 are checked in steps 584A$_p$–584C$_p$ and 586A$_p$–586C$_p$, respectively.

Referring again back to FIGS. 20A and 20B, once the tray is at the appropriate location and position, the system checks, at 590, the position of the shelf 254. The system then branches at 592. If the shelf is up, the system places the tray at the appropriate position at 594 and checks the capacity of the cart at step 596. If the lower half of the cart is fill, the system executes a drop shelf routine at 598 that causes the robot to lower the shelf on the GPMC. The robot moves to a shelf unlatch position and unlatches the shelf, as was described above. The robot then lowers the shelf to a lowered position, also as described above. The system then checks the shelf to ensure that it was lowered properly. If the shelf was not lowered properly, the robot reports a fault and stops moving. This allows manually lowering of the shelf. If the shelf is manually lowered, the robot checks this action and again reports an error if the shelf is not properly lowered. Once the shelf is properly lowered, the robot stores the position of the last tray placed on the cart at step 600 and then moves up to a clearance position above the GPMC and over to the pick up point at step 602.

If the lower half of the cart is not full and the shelf is up, the system stores the position of the last container placed on the cart at 604. The system then checks the capacity of the cart at 606, and moves the robot up to a clearance position above the GPMC and over to the pick up point at 602.

Loading a tray in an ERMC according to choice 420 is similar to loading a GPMC as just described. To place a tray on an ERMC the system resets the pick and place calculations by calling the cycle start routine at step 650. The product type, number, and name are then initialized by calling the product routine at step 652. The location and position are checked at 654 by calling the location routine and the tray is picked from the pick up point according to the pick ERMC routine 656 shown in FIG. 23A. Due to the similarity of the routines 656 and 570, the routine 656 will not be discussed in detail. Once the tray is grasped or picked, the robot moves to the appropriate location as shown at step 658, places the tray on the cart at step 660, stores the location of the placed tray, checks the capacity of the cart at 666, and moves back to the pick up location at step 668.

The operation of the robot according to choices 425, 430, 435, and 440, should be apparent from the description and drawings herein and additional details are not provided. As can be seen from the above, the present invention provides an end effector or gripper and a system that are capable of loading pallets and carts with various mail trays and tubs. Many possible forms of the invention may be constructed based on the teachings set forth herein. Therefore, while the present invention has been described in reference to particular embodiments and examples, it should be understood that the invention is not confined to the particular construction and arrangement of the components illustrated and described, but embraces all forms encompassed by the following claims.

What is claimed is:

1. A containerization and palletizing system comprising:
   a cell defined by a frame and a surface, the cell having a top and at least one bay defined by a portion of the surface and a portion of the frame, the at least one bay having an assigned location in the cell and configured to accept a container;
   a robot positioned on top of the cell, mounted to the frame, and movable from a home position to the location of the at least one bay, the robot having an end effector with at least one bearing, a containment plate supported by the at least one bearing such that the plate may travel in a vertical direction, and a sensor positioned to sense movement of the plate;
   a conveyor having a belt and operable to move trays on the belt, at least a portion of the conveyor positioned in the cell;
   a controller coupled to the robot and the sensor and operable to determine a distance moved by the containment plate and to control movement of the robot from the home position to a position over the conveyor and then to the assigned location of the at least one bay, wherein the controller controls the end effector to grasp a tray from the conveyor when the robot is at the position over the conveyor and to release the tray when the robot is at the assigned location of the at least one bay.

2. A system as in claim 1, wherein the end effector comprises a plurality of rotatable, offset fingers.

3. A system as in claim 2, wherein the plurality of fingers consists of a first pair of rotatable fingers and a second pair of rotatable fingers.

4. A system as in claim 3, wherein the end effector further comprises a movable carriage and the first pair of fingers is coupled to the movable carriage.

5. A system as in claim 2, wherein the end effector has a shelf lowering device.

6. A system as in claim 1, wherein the cell is defined by a perimeter fence, and the fence has at least one door.

7. A system as in claim 6, wherein the controller is operable to stop movement of the robot when the at least one door is open.

8. A system as in claim 1, further comprising a second cell, a second robot in the second cell, and a second controller for controlling the second robot, wherein at least a portion of the conveyor system is positioned in the second cell.

9. A system as in claim 1, wherein the robot is a gantry robot.

10. A top-loading system for containerizing trays, the system comprising:
    a cell defined by a frame, the cell having a top and a plurality of bays defined by a portion of a surface and a portion of the frame;
    at least one container in one of the plurality of bays;
    an overhead robot positioned within the cell, mounted to the frame, and having an end effector with a plurality of offset fingers, and at least one actuator for moving the fingers;
    a containment plate coupled to the end effector such that the plate may travel in a vertical direction, and a sensor positioned to sense movement of the plate;
    a conveyor extending through the cell and operable to move trays;
    wherein the robot is operable to pick a tray from the conveyor and place it in the at least one container in one of the plurality of bays.

11. A top loading system as in claim 10, wherein the at least one container is a cart.

12. A top loading system as in claim 10, wherein the at least one container is a pallet.

13. A top loading system as in claim 10, wherein the trays include mail trays and mail tubs.

* * * * *